US012215051B2

(12) United States Patent
Charles et al.

(10) Patent No.: US 12,215,051 B2
(45) Date of Patent: Feb. 4, 2025

(54) GLASS PRODUCTION METHOD AND INDUSTRIAL GLASS-MAKING FACILITY

(71) Applicant: ARC FRANCE, Arques (FR)

(72) Inventors: Hervé Charles, Arques (FR); Sébastien Donze, Arques (FR); Xavier Ibled, Arques (FR); François Famchon, Arques (FR); Jean-Marie Bonningues, Arques (FR)

(73) Assignee: ARC FRANCE, Arques (FR)

( * ) Notice: Subject to any disclaimer, the term of this patent is extended or adjusted under 35 U.S.C. 154(b) by 834 days.

(21) Appl. No.: 17/288,116

(22) PCT Filed: Oct. 29, 2019

(86) PCT No.: PCT/EP2019/079487
§ 371 (c)(1),
(2) Date: Apr. 23, 2021

(87) PCT Pub. No.: WO2020/089206
PCT Pub. Date: May 7, 2020

(65) Prior Publication Data
US 2021/0380464 A1   Dec. 9, 2021

(30) Foreign Application Priority Data

Oct. 29, 2018   (FR) ...................................... 1860020

(51) Int. Cl.
*C03B 1/02*   (2006.01)
*C03C 1/02*   (2006.01)
(Continued)

(52) U.S. Cl.
CPC ................. *C03C 1/026* (2013.01); *C03B 1/02* (2013.01); *C03C 3/078* (2013.01); *C03C 3/112* (2013.01)

(58) Field of Classification Search
CPC ....................................................... C03B 1/02
See application file for complete search history.

(56) References Cited

U.S. PATENT DOCUMENTS 2,978,340 A * 4/1961 Alford .................. C04B 20/066
501/39
3,967,943 A   7/1976 Seeley
(Continued)

FOREIGN PATENT DOCUMENTS

| CN | 1882505 A | 12/2006 |
| CN | 106630607 A | 5/2017 |

(Continued)

OTHER PUBLICATIONS

Tokuyama "Sodium silicate cullet", https://www.tokuyama.co.jp/eng/products/chemicals/sodium_silicate.html (Year: 2021).*
(Continued)

*Primary Examiner* — Cynthia Szewczyk
(74) *Attorney, Agent, or Firm* — Volpe Koenig

(57) ABSTRACT

The invention relates to a glass production method comprising charging a glass furnace with solid-state raw materials, said raw materials comprising granular glassy sodium silicate and having a moisture content of less than 1%, preferably 0%, by weight, and powdered calcium oxide.

17 Claims, 10 Drawing Sheets

(51) Int. Cl.
   *C03C 3/078* (2006.01)
   *C03C 3/112* (2006.01)

(56) References Cited

U.S. PATENT DOCUMENTS

| | | |
|---|---|---|
| 4,028,131 A | 6/1977 | Pons |
| 4,503,158 A | 3/1985 | Richard |
| 2005/0022557 A1 | 2/2005 | Carty |
| 2006/0101855 A1 | 5/2006 | Pita-Szczesniewski |
| 2007/0021287 A1* | 1/2007 | Hockman ............... C03C 1/026 501/27 |
| 2007/0122332 A1* | 5/2007 | Jacques .................. C03C 1/02 423/334 |
| 2007/0199350 A1* | 8/2007 | Butts .................. C03C 1/00 501/27 |
| 2012/0216574 A1 | 8/2012 | Dewet-Smith et al. |
| 2014/0274652 A1* | 9/2014 | Mastek .................. C03C 1/02 501/27 |

FOREIGN PATENT DOCUMENTS

| | | |
|---|---|---|
| CN | 107226615 A | 10/2017 |
| EP | 2668139 B1 | 5/2017 |
| FR | 2859991 A1 | 3/2005 |
| GB | 1330513 A | 9/1973 |
| JP | 2007505811 A | 3/2007 |
| JP | 2009527455 A | 7/2009 |
| RU | 2246453 C2 | 2/2005 |
| RU | 2291115 C1 | 1/2007 |
| RU | 2597008 C1 | 9/2016 |
| WO | 2009001586 A1 | 12/2008 |
| WO | 2012161275 A1 | 11/2012 |

OTHER PUBLICATIONS

I.I. Kitaigorodsky, "Glass Technology" Moscow (1961).

* cited by examiner

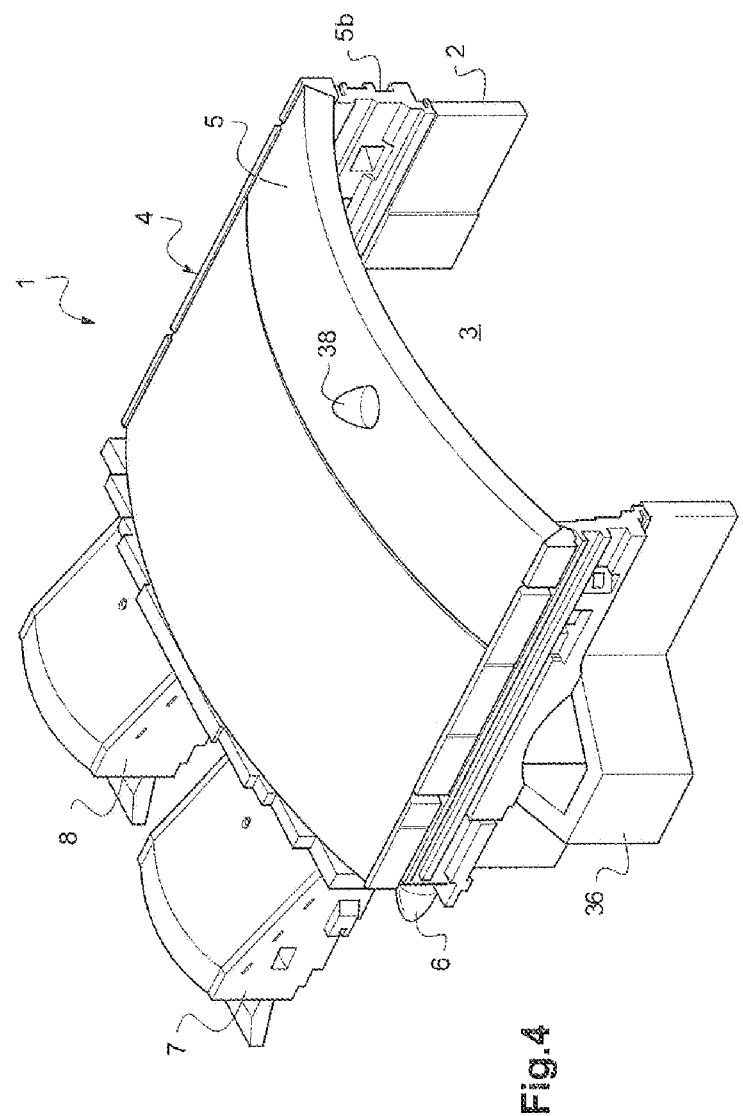

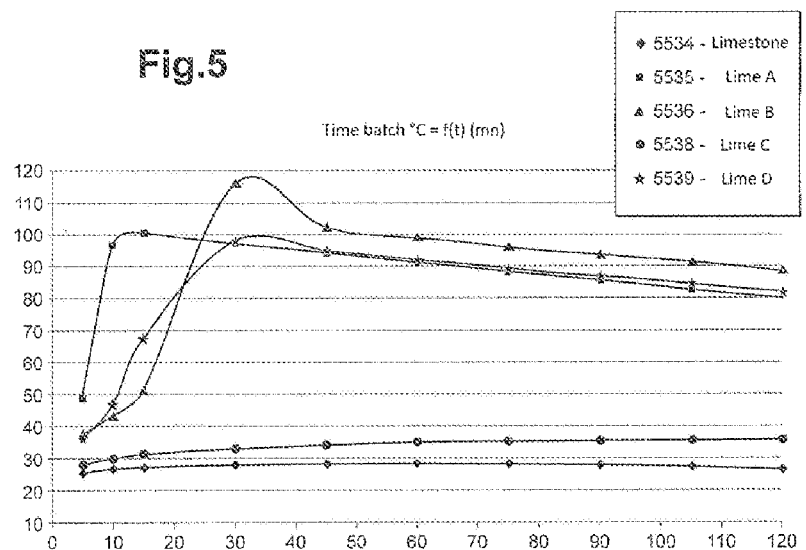
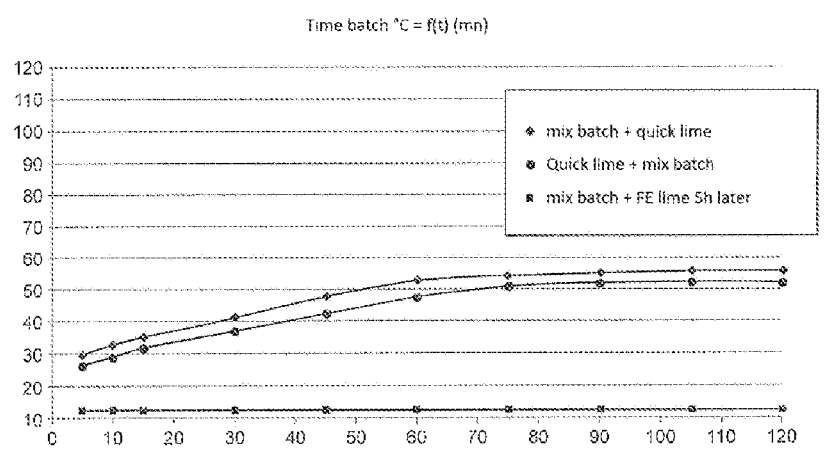

GLASS PRODUCTION METHOD AND INDUSTRIAL GLASS-MAKING FACILITY

INVENTIVE FIELD

The invention relates to the field of the glass-making industry.

BACKGROUND

The melting of the component materials of glass requires adding a large quantity of energy. The temperature of the glass bath is approximately 1300 to 1500° C. According to its composition, the glass is intended for direct household use, drinking glasses, bottles and containers, panes of glass; or indirect, ceramic hobs; or industrial.

The furnace is subjected to very high thermal and mechanical stresses. The furnace is built with high-quality refractory coatings. These refractory coatings are costly and sensitive to certain components of the glass liable to react chemically. Since the refractory coatings are poor heat conductors, the heating of the glass bath is carried out from above.

A liquid- or gas-fuel flame burner is disposed between the glass bath and the top of the furnace, called crown. The glass bath is essentially heated by radiation. The output temperature of the gases is from 1300 to 1600° C. according to the family of glass.

Moreover, the manufacturing of glass releases large quantities of gas. The glass bath is degassed for several hours to avoid the formation of bubbles in the glass. To facilitate the degassing, refining additives such as sulphates can be used. The furnace operates continuously by being supplied with raw materials at one end and by collecting the refined glass at the other end.

The output gases, coming from the degassing and coming from the combustion, are evacuated by a chimney.

The applicant pursued the goal of a major reduction in the consumption of energy with respect to the weight of glass produced.

In soda-lime glass, the main initial materials are lime, soda for example in the form of $Na_2CO_3$ sodium carbonate and silica in the form of quartz sand. The lime and the sodium carbonate release $CO_2$ during the refining of the glass.

The document U.S. Pat. No. 3,967,943 describes the implementation of an aqueous solution of sodium silicate sometimes called waterglass. A significant quantity of water must thus be evaporated.

The document US2005/0022557 describes an $Na_2CO_3$ and $SiO_2$ pre-mix and in parallel a $CaCO_3$ and $SiO_2$ premix with pre-reaction, followed by a mixing of the two premixes and of a complement of $SiO_2$ and then by introduction into a glass-making furnace.

The document US2012/0216574 relates to a method for manufacturing glass comprising the calcining of the $CaCO_3$ to form CaO, the formation of an $Na_2SiO_3$ glass in liquid phase, and the mixing in liquid phase of the CaO and of the $Na_2SiO_3$ to form a soda-lime glass.

The document EP 2 668 139 describes the manufacturing of pellets comprising an $SiO_2$ core, an inner layer of $SiO_2$ and of $Na_2O$ and an outer layer of $CaCO_3$ and of $Na_2CO_3$. The pellets are charged into a glass-making furnace.

The applicant carried out trials. The replacement of the $Na_2CO_3$ with granular glassy sodium silicate has unfavorable economic results because of the high cost of the granular glassy sodium silicate. Moreover, numerous requirements must be taken into account. It must be possible for a human to manipulate the raw materials without danger. Therefore, anhydrous caustic soda is difficult to implement. The raw materials are stored at an ambient temperature ranging from −20° C. to +50° C. and at a highly variable ambient humidity. Since the mixing is difficult to carry out in the furnace, the raw materials are mixed before charging. Certain materials are very hygroscopic, in particular inversely with respect to their particle size and/or their chemical formulation. However, the caking of the raw materials should be avoided. The formation into pellets or granules requires an additional operation. Moreover, the carryover constitutes losses of raw materials and especially a cause of plugging of the flue-gas ducts that reduces the draft of the furnace and requires stoppages in production to carry out a cleaning, a hard task. The silica is difficult to melt because of a high melting temperature and slow melting kinetics.

Despite these obstacles, the applicant continued and developed a method for manufacturing glass providing high energy performance, reduced wear of the walls of the furnace, faster melting and refining of the glass.

SUMMARY

The applicant developed a method for manufacturing glass with granular glassy sodium silicate. Such a granular glassy sodium silicate allows a reduction of the emissions of $CO_2$ by more than 5%, a reduction of the dust in the flue gases by more than 15%, a reduction of the energy consumption by more than 5%, a specific load (productivity) increased by more than 15% and heating campaigns longer by at least 20%. Here, heating campaign means the time that passes between two complete rebuilds of the refractory walls of the furnace, approximately several years. Surprisingly, the speed of melting of the silica is increased which reduces the risks of segregation between the materials having markedly different melting temperatures. The viscosity is reduced, which results in faster refining releasing the dissolved gases.

The invention proposes a method for manufacturing glass comprising the supply in a glass-making furnace of raw materials in the solid state, said raw materials comprising granular glassy sodium silicate and having a moisture content of less than 1% by weight and powdery calcium oxide.

The simultaneously supply of grains of glassy sodium silicate and anhydrous calcium oxide powder (quick lime) avoids the loss of calcium oxide in carryover, produces rapid melting at the surface of the bath in the furnace despite the predominantly millimetric, or even centimetric, particle size of the granular glassy sodium silicate.

The terms "granular glassy sodium silicate" mean sodium silicate obtained using a method for melting silica and a source of soda comprising in particular sodium carbonate as opposed to the sodium silicate obtained chemically—calcium chloride and caustic soda in flakes, under pressure and at a high temperature—used for example in non-medicinal products sold in pharmacies, the cost of which is considerably higher.

The grains of granular glassy sodium silicate and the powder of calcium oxide are mixed before charging.

In one embodiment, the moisture content of the granular glassy sodium silicate is 0%.

In one embodiment, said granular glassy sodium silicate has a particle size between 0.1 and 30 mm. A particle size of less than 0.1 mm causes an increase in the carryover and a risk of caking before charging. A particle size greater than 30 mm causes a slowing down of the melting of the raw materials, a greater heterogeneity and a longer refining time. Unexpectedly, the range of particle size is broad, which allows to implement a grinder with a low rate of rejection.

In one embodiment, the granular glassy sodium silicate is at the ambient temperature. Preheating is avoided.

In one embodiment, the method comprises a previous step of storing said granular glassy sodium silicate.

In one embodiment, said stored granular glassy sodium silicate is in the form of balls, for example of approximately 40 to 60 mm, or of plates, for example having a length and a width greater than 100 mm.

In one embodiment, the method comprises a step of grinding for obtaining said particle size between 0.1 and 30 mm.

In one embodiment, the grinding step is carried out less than 7 days before the charging of said granular glassy sodium silicate. The risk of caking is very low.

In one embodiment, the granular glassy sodium silicate has a molar ratio of between 2.5 and 5 $SiO_2$ for 1 $Na_2O$. A low melting point is obtained. Below 2.5, the melting point would be higher and the sodium silicate less stable. Above 5, the granular glassy sodium silicate would be more difficult to melt. The granular glassy sodium silicate with the ratio of 2.5 and 5 $SiO_2$ for 1 $Na_2O$ is not very sensitive to the ambient humidity, at least in a temperature climate, and can be stored without caking. Preferably, the molar ratio is between 2.5 and 3.5 $SiO_2$ for 1 $Na_2O$.

In one embodiment, at least 17% of the calcium is supplied by the powdery calcium oxide for soda-lime glass.

In one embodiment, at least 80% of the calcium is supplied by the powdery calcium oxide for soda-lime glass.

In one embodiment, at least 99% of the calcium is supplied by the powdery calcium oxide for soda-lime glass.

In one embodiment, at least 80% of the calcium is supplied by the powdery calcium oxide for fluosilicate glass.

In one embodiment, at least 99% of the calcium is supplied by the powdery calcium oxide for fluosilicate glass.

In one embodiment, the sodium is supplied at more than 1% in the form of granular glassy sodium silicate for soda-lime glass.

In one embodiment, the sodium is supplied at more than 1% in the form of granular glassy sodium silicate for fluosilicate glass.

In one embodiment, the sodium is supplied between 4 and 25%, more preferably between 5 and 20%, even more preferably between 10 and 15% in the form of granular glassy sodium silicate.

In one embodiment, the granular glassy sodium silicate is mixed with the other raw materials comprising in particular at least one out of sodium carbonate, calcium carbonate, calcium oxide, magnesium carbonate, magnesium oxide, alumina, boron oxide, potassium oxide and sodium fluosilicate.

In one embodiment, the granular glassy sodium silicate is mixed with the other raw materials comprising in particular at least one out of sodium, calcium, magnesium, boron, potassium, silicon, aluminum and fluorine.

In one embodiment, said raw materials are mixed before charging. The molten bath is more homogenous.

In one embodiment, the calcium oxide and/or the magnesium oxide are supplied after the other raw materials. It is possible for at least one of the other raw materials to have sufficient hydrophila to trap the water present, in particular in the sand, and thus prevent the water-calcium and/or magnesium oxide reaction that generates dust. It is possible to go without drying the sand.

In one embodiment, lead is not voluntarily supplied to the raw materials.

In one embodiment, the mixture of said raw materials does not have a fraction in the liquid state. The mixture remains granular.

In one embodiment, said granular glassy sodium silicate adds between 2 and 50% of the sodium of the glass, the rest being supplied in the form of sodium carbonate, sodium sulphate, cullet and feldspar.

In one embodiment, said granular glassy sodium silicate adds between 4 and 15% of the sodium of the glass for soda-lime glass, the rest being supplied in the form of sodium carbonate. At around 10%, the effect of the granular glassy sodium silicate on the melting point, the refining kinetics, the reduction in the wear of the walls of the furnace and the reduction in the carryover is of great interest.

In one embodiment, said calcium oxide adds between 1 and 100% of the calcium of the glass, the rest being supplied in the form of cullet calcium carbonate, dolomite and feldspar. Adding even a little powdery quick lime is of interest.

In one embodiment, said raw materials comprise silica or silica sand, sodium carbonate, and cullet to obtain a glass with $Na_2O$ between 10 and 20% by weight of the total. A high-quality soda-lime glass is obtained. In one embodiment, said raw materials comprise silica or silica sand, cullet, a source of fluorine, in particular sodium fluosilicate and a source of alumina, in particular feldspar. A fluosilicate glass adapted in particular to the manufacturing of plates and dishes is obtained.

In one embodiment, the heating of the furnace, for soda-lime glass, is carried out at more than 50% by at least one burner with a substantially horizontal flame, in particular loop and/or lateral, the rest being supplied by electrodes. The concentration of nitrogen oxides is low.

In one embodiment, the burner is supplied with air and combustible gas, in particular natural gas, or fuel oil.

In one embodiment, the burner is supplied with oxygen and any type of combustible gas, in particular natural gas, or fuel oil.

In one embodiment, 4% to 30%, preferably 10% to 20%, of the sodium is supplied in the form of granular glassy sodium silicate, with 0% of the calcium supplied in the form of calcium oxide, the calcium being supplied in particular in the form of calcium carbonate, dolomite and feldspar instead of the calcium oxide.

In one embodiment, in a furnace with a loop gas-air burner and a crown gas-oxygen burner, 10% of the sodium is supplied in the form of granular glassy sodium silicate.

The invention proposes a method for manufacturing glass comprising the supply in a glass-making furnace of raw materials in the solid state, said raw materials comprising granular glassy sodium silicate at 4% to 30%, preferably 10% to 20% of the sodium, and having a moisture content of less than 1% by weight, without supply of calcium oxide.

In one embodiment, 10% to 50%, preferably 20% to 40%, of the calcium is supplied in the form of calcium oxide, with 0% of the sodium supplied in the form of sodium silicate.

The invention proposes a method for manufacturing glass comprising the supply in a glass-making furnace of raw materials in the solid state, said raw materials having a moisture content of less than 1% by weight, and 10% to 50%, preferably 20% to 40%, of the calcium being supplied in the form of calcium oxide, with 0% of the sodium supplied in the form of sodium silicate. The invention relates to an industrial glass-making facility comprising a furnace comprising a tank for melted glass and a system for supplying raw materials provided with a member of supplying granular glassy sodium silicate. The member for supplying sodium silicate comprises a sodium silicate grinder with an output connected to an input of the furnace directly or via a buffer storage, and a storage of sodium silicate in the form of balls or plates connected to an input of the grinder.

A difference is made between the aggregate obtained by firing, grinding, or removal from a deposit, on the one hand, and the granules coming from an operation of granulation. Here, an aggregate is used. Said aggregate resembles cullet in appearance.

In one embodiment, the system for supplying raw materials comprises a mixer of raw materials disposed between the furnace and the member for supplying granular glassy sodium silicate. The mixing can be carried out by a conveyor belt receiving the raw materials and letting them fall downstream.

A high homogeneity before the input of the furnace is obtained. This favors the melting kinetics.

In one embodiment, the glass-making facility comprises at least one flue for evacuating the combustion gases coming from the furnace, the flue opening into a furnace for firing glass-making raw materials, in particular limestone and/or dolomite and more broadly mineral stone.

BRIEF DESCRIPTION OF THE DRAWINGS

Other features and advantages of the invention will appear upon examination of the following detailed description, and of the appended drawings, in which:

FIG. 4 is a perspective schematic view of a glass-making furnace according to one embodiment;

FIG. 5 shows curves of heating according to the time for limestone and four limes;

FIG. 6 shows curves of heating according to the time for three mixtures containing lime;

DETAILED DESCRIPTION OF THE PREFERRED EMBODIMENTS

Figure 1:
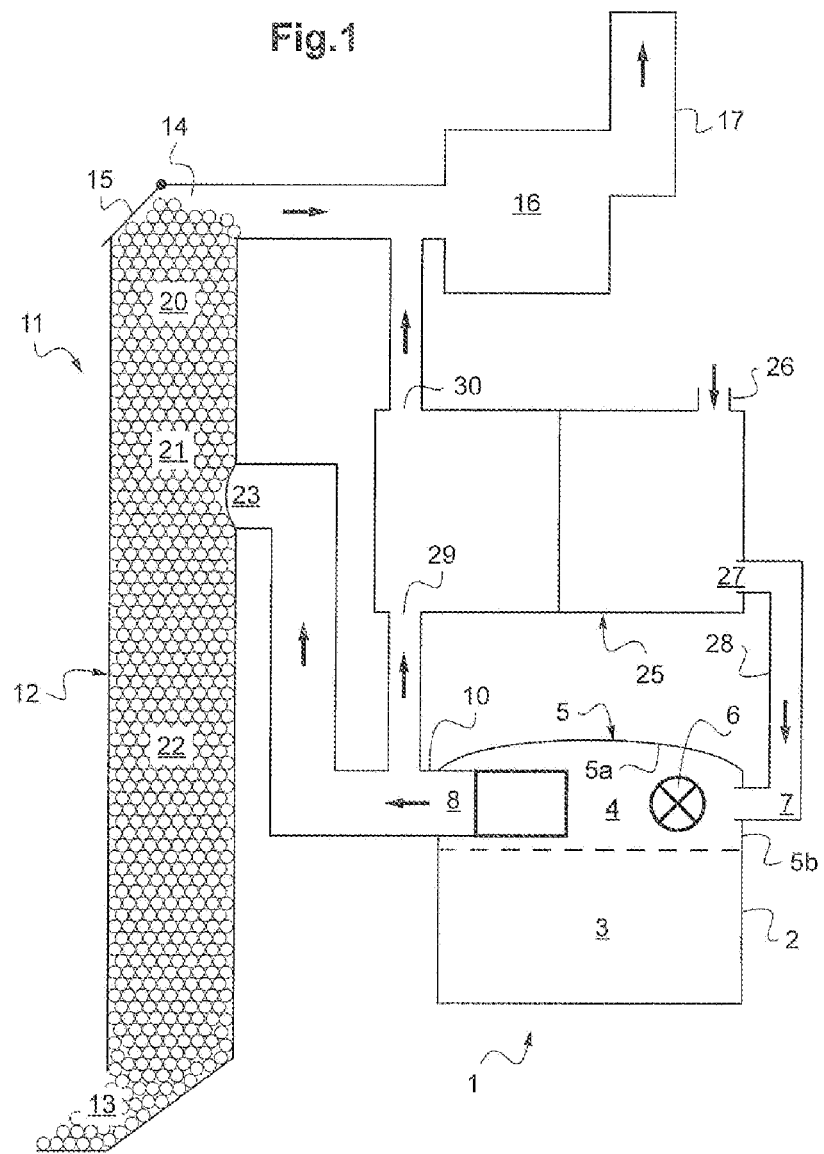
FIG. 1 is a cross-sectional view of a combined facility according to one aspect of the invention.

The appended drawings can not only be used to complete the invention, but also contribute to its definition, if necessary.

The applicant carried out industrial trials in a continuous production furnace in order to understand the melting kinetics phenomena and measure real changes in production. A laboratory furnace operating by batch, even with a high capacity, would not have allowed a keen understanding. The furnace has a past production of soda-lime glass with lateral burners and providing of calcium carbonate, sodium carbonate, silica as main materials, alumina and dolomite as secondary, refining, coloring and decolorizing materials. The alumina and the dolomite are qualified as secondary because of their smaller proportions than the main materials. The feldspar can add alumina, but also Si, Na and K. Lead is not voluntarily supplied to the raw materials. The mixture does not have a fraction in the liquid state.

In the trials reported below, the granular glassy sodium silicate was prepared from chips or balls passed through a grinder. The chips can measure from 10×10×10 mm to 20×200×200 mm. The balls can measure from 40 to 70 mm in each of their dimensions. At the output of the grinder, the particle size of the granular glassy sodium silicate was between 0.1 and 30 mm maximum. Thus, the screening is easy and the rejection rate very low. The granular glassy sodium silicate is anhydrous. The granular glassy sodium silicate has a moisture content of less than 1%, in practice of 0%. The granular glassy sodium silicate has a molar ratio of approximately 3 $SiO_2$ for 1 $Na_2O$. Preferably, the molar ratio is between 2.5 and 3.5 $SiO_2$ for 1 $Na_2O$. The conditions of handling and of storage can bring about a very slight taking on of moisture, in certain circumstances, while remaining at a content of less than 1%.

The sand has a composition: $SiO_2$ at least 99%, $Al_2O_3$ less than 1%, $K_2O$ less than 0.1%, $TiO_2$ less than 0.03%, $Fe_2O_3$ less than 0.015%. The other elements are present in trace amounts. The sand has a D50 particle size between 0.20 and 0.25 mm. The sand has a particle size with at most 3% rejection with a screen of 0.355 mm, and at most 1% passage with a screen of 0.125 mm.

The sodium carbonate has a composition: $Na_2CO_3$ 99.75%, NaCl 0.03% and $H_2O$ less than 0.1%. The other elements are present in trace amounts. The sodium carbonate has a D50 particle size between 0.15 and 0.25 mm. The sodium carbonate has a particle size with at most 0.5% rejection with a screen of 0.600 mm, at least 90% rejection with a screen of 0.150 mm and at most 2% passage with a screen of 0.075 mm.

The calcium oxide has a composition: CaO at least 93%, MgO less than 2%, $CO_2$ less than 2%, $Fe_2O_3$ less than 0.1%, S less than 0.06%. The other elements are present in trace amounts. The calcium oxide has a D50 particle size between 0.08 and 0.12 mm. The calcium oxide has a particle size with at most 1.6% rejection with a screen of 5.00 mm, and at most 55% passage with a screen of 0.090 mm.

The cullet can comprise $SiO_2$ from 68 to 75%, $Na_2O$ from 10 to 15%, CaO from 8 to 12%, MgO from 0 to 3%, $Al_2O_3$ from 0 to 1%.

The raw materials are at the ambient temperature averaged over several days, or from 5 to 20° C. The moisture content of the mixture ready to be charged is greater than 0 and less than 4%.

In trial A, carried out with a loop gas-air burner and a crown gas-oxygen burner, 10% of the sodium was supplied in the form of granular glassy sodium silicate, in partial substitution of the sodium carbonate and of the silica, the number of moles of Na and of Si being preserved. The other raw materials are unchanged. The composition of the glass produced is preserved. The expected effect was a reduction in the emissions of $CO_2$ in proportion to the partial substitution, or 3% of the loss. This reduction was obtained. Moreover, a reduction of 15.5% in the carryover and condensates with respect to a previous production without substitution was measured, or 100% of the calcium supplied in the form of calcium carbonate and dolomite, and 100% of the sodium supplied in the form of sodium carbonate and/or feldspar. The energy consumption per ton of glass produced was lowered by 2.6% during maximum production. The daily production of the furnace increased by 19%. The cause of this increase is due to a change in eutectics due to the low melting temperature of the sodium silicate used. The fact that a part of the silicon is supplied in a molecule with a melting point lower than the melting point of the silica and of the other elements such as in particular the limestone and the alumina contributes to a faster start of melting and to a reduced energy consumption. Contrary to the sodium carbonate, the soda in silicate form is already in glassy form.

In trial B, carried out with a loop gas-air burner and a crown gas-oxygen burner, 100% of the calcium carbonate was replaced by calcium oxide in the form of quick lime, the number of moles of Ca being preserved, and 9% of the sodium of the final glass was supplied in the form of granular glassy sodium silicate, in partial substitution of the sodium carbonate and of the silica, the number of moles of Na and of Si being preserved. The expected effect was a reduction in the emissions of $CO_2$ in proportion to the partial substitutions. This reduction was obtained. Moreover, a reduction of 14.3% in the carryover was measured. The energy consumption per ton of glass was lowered by 10.7% at constant tonnage. The daily production of the furnace can increase by 26%. While quick lime is supposed to generate a lot of carryover, this result was considered to be of great interest.

In trial C, carried out with a loop gas-air burner, alone, without a 30 crown gas-oxygen burner, 100% of the calcium carbonate was replaced by quick lime—calcium oxide, the number of moles of Ca being preserved, and 9% of the sodium of the final glass was supplied in the form of granular glassy sodium silicate, in partial substitution of the sodium carbonate and of the silica, the number of moles of Na and of Si being preserved. The expected effect was a reduction in the emissions of $CO_2$ in proportion to the partial substitutions. This reduction was obtained. Moreover, a reduction of 14.5% in the carryover was measured. The energy consumption per ton of glass was lowered by 12.7%. The daily production of the furnace increased by 20.7%. While quick lime is supposed to generate a lot of carryover in an end-fired furnace, this result was considered to be remarkable.

The powdery calcium oxide was provided in bags (big bags) of 790 kg, with a size from 0 to 5 mm. The calcium oxide has a composition: CaO at least 93%, MgO less than 2%, $CO_2$ less than 2%, $Fe_2O_3$ less than 0.1%, S less than 0.06%. The other elements are present in trace amounts. The calcium oxide has a D50 particle size between 0.08 and 0.12 mm. The calcium oxide has a particle size with at most 1.6% rejection with a screen of 5.00 mm, and at most 55% passage with a screen of 0.090 mm. The calcium oxide was supplied to the mixture of the other raw materials at least 10 minutes after the other raw materials were provided. The moisture content of the charged mixture is 2.5%.

The beginning of melting of the granular glassy sodium silicate facilitates the melting of the other materials. The beginning of melting of the granular glassy sodium silicate creates a wetting effect that limits the take-off of the fine particles of raw material, in particular of the sodium carbonate, of alumina and of calcium oxide in the flue gases, resulting in the reduction in the carryover. The comparison of trials B and C shows that the crown burner is optional with a replacement of 100% of the limestone with calcium oxide and 9% of the $Na_2O$ in the final glass proportionally in the form of granular glassy sodium silicate. Trials A and C were carried out in the same furnace during the same production campaign and with the same raw materials, except for the substitutions mentioned. The trials were carried out for a time sufficient to obtain stabilized results.

Trials D to G were carried out in a second furnace with loop gas-air burners like for trials A to C. In trials D to G, the calcium oxide was delivered in bags (big bags) prepared to the desired weight. The calcium oxide is the same as for trials A to C. Trials D to G were carried out in the same furnace during the same production campaign and with the same raw materials, except for the substitutions mentioned. The trials were carried out for a time sufficient to obtain stabilized results.

The calcium oxide was supplied into the mixture of the other raw materials at least 10 minutes after the other mixed raw materials were provided. The moisture content of the charged mixture is 2.5%.

In trial D, 21% of the limestone was replaced proportionally by quick lime—calcium oxide—as a partial substitution of the calcium carbonate, the number of moles of Ca being preserved, and 14% of the $Na_2O$ of the final glass was supplied proportionally in the form of granular glassy sodium silicate, as a partial substitution of the sodium carbonate and of the silica, the number of moles of Na and of Si being preserved. The expected effect was a reduction in the emissions of CO2 in proportion to the partial substitutions. A lowering of the melting temperature by approximately 25 to 30° C. with respect to a previous production without substitution was observed, or 100% of the calcium supplied in the form of calcium carbonate, and 100% of the sodium supplied in the form of sodium carbonate or feldspar. The wear of the furnace is reduced by approximately 25%. The energy consumption decreases by 5%. The number of inclusions of gas in the glass does not show significant variation.

In trial E, 21% of the limestone was replaced proportionally by quick lime—calcium oxide—as a partial substitution of the calcium carbonate, the number of moles of Ca being preserved, and 9% of the Na2O of the final glass was supplied proportionally in the form of granular glassy sodium silicate, as a partial substitution of the sodium carbonate and of the silica, the number of moles of Na and of Si being preserved. The expected effect was a reduction in the emissions of $CO_2$ in proportion to the partial substitutions. A lowering of the melting temperature by approximately 25 to 30° C. with respect to a previous production without substitution was observed, or 100% of the calcium supplied in the form of calcium carbonate, and 100% of the sodium supplied in the form of sodium carbonate or feldspar. The wear of the furnace is reduced by at least 30%. The energy consumption decreases by 5%. The number of inclusions of gas in the glass, often called seeds, decreases by 45% and the number of inclusions of gas in the glass, having a dimension greater than 0.10 mm, decreases by 40%.

In trial F, 21% of the limestone was replaced proportionally by quick lime—calcium oxide—as a partial substitution of the calcium carbonate, the number of moles of Ca being preserved, and 4.5% of the $Na_2O$ of the final glass was supplied proportionally in the form of granular glassy sodium silicate, as a partial substitution of the sodium carbonate and of the silica, the number of moles of Na and of Si being preserved. The expected effect was a reduction in the emissions of CO2 in proportion to the partial substitutions. A lowering of the melting temperature by approximately 25 to 30° C. with respect to a previous production without substitution was observed, or 100% of the calcium supplied in the form of calcium carbonate, and 100% of the sodium supplied in the form of sodium carbonate or feldspar.

The wear of the furnace is reduced by at least 35%. The energy consumption decreases by 3 to 5%. The number of inclusions of gas in the glass, often called seeds, decreases by 45 to 50% and the glass no longer has inclusions of gas having a dimension greater than 0.10 mm.

In trial G, 21% of the calcium of the final glass was supplied in the form of quick lime—calcium oxide—as a partial substitution of the calcium carbonate, the number of moles of Ca being preserved. The expected effect was a reduction in the emissions of $CO_2$ in proportion to the partial substitutions. A lowering of the melting temperature was observed. The wear of the furnace is reduced by at least 35%. The energy consumption decreases by 3%. The number of inclusions of gas in the glass, often called seeds, decreases by 55% and the number of inclusions of gas in the glass, having a dimension greater than 0.10 mm, decreases by 70%. A concentration of 10 to 30% of the calcium of the final glass supplied in the form of quick lime—calcium oxide—turns out to be of interest. A concentration of 1 to 15%, preferably 4 to 15%, more preferably 4 to 10%, of the sodium of the final glass supplied in the form of granular glassy sodium silicate turns out to be of interest.

Moreover, in trials B to G, a reduction in the wear of the furnace by at least 20% estimated by the concentration of refractory oxides, in particular of zircon, coming from the refractory coating of the furnace in the manufactured glass was observed. A gain of time between two rebuilds of the refractory coating for the same annual production is possible, or a greater annual tonnage produced for the same service life of the furnace. An improvement in the quality of the glass was observed in a furnace having exceeded 75% of its campaign time, in trials D to G.

In general a partial supply of the sodium in the form of granular glassy sodium silicate turns out to be positive, for concentrations of sodium in the glass extending over a broad range, as long as there is a supply of sodium by a material other than cullet and/or supply of silicon by a material other than cullet. A very high supply would risk causing a reduction in the performance obtained, probably by an effect of thermal insulation by a layer melted rapidly at the surface. The concentration of sodium supplied in the form of granular glassy sodium silicate is between 2 and 50%. For soda-lime glass, the concentration of sodium supplied in the form of granular glassy sodium silicate is preferably between 4 and 15%. The rest is supplied in the form of sodium carbonate, feldspar or cullet between 5 and 95%.

The calcium oxide adds between 1 and 100% of the calcium of the glass, the rest being supplied in the form of calcium carbonate, for example limestone, dolomite, etc. The calcium oxide is mixed after the step of mixing the other materials chosen from: sodium carbonate, limestone (calcium carbonate), dolomite (magnesium carbonate and calcium carbonate), boron oxide, potassium carbonate, sand (silica), feldspar (silica, soda, alumina), nepheline (silica, soda, alumina, potassium), alumina and sodium fluosilicate. A delay of at least 10 minutes is provided between the first and the second mixing step.

In one embodiment, the raw materials comprise:
powdery quick lime,
granular glassy sodium silicate,
silica sand,
sodium carbonate, and
granular cullet to obtain a glass with $Na_2O$ between 10 and 20% by weight of the total.

In one embodiment, the raw materials comprise:
powdery quick lime,
granular glassy sodium silicate,
silica sand,
granular cullet,
powdery or granular sodium fluosilicate and
powdery or granular feldspar.

Here, powdery means a material having a median particle size of less than 1 mm and granular means a material having a median particle size greater than 5 mm.

The raw materials are charged in an industrial furnace for producing glass continuously. In one embodiment, the furnace is provided with a burner having a substantially horizontal flame or a loop burner, the flame and the flue gases traveling over a U-shaped trajectory from a wall, above the surface of the bath of melted or melting glass. The loop burner, gas-air or fuel-oil, can be completed by a gas-oxygen or fuel-oil-oxygen crown burner, or by at least two submerged heating electrodes. The heating of the furnace is ensured at more than 50% by the loop burner.

In one embodiment, the furnace is provided with air or oxygen gas or fuel oil combustion lateral burners, from one or both of the side walls of the furnace, above the surface of the bath of melted or melting glass. A complement can be supplied by at least two submerged heating electrodes. The heating of the furnace is ensured at more than 50% by the lateral burners.

In one embodiment, the glass-making facility comprises, at the output of the furnace, at least one flue for evacuating the combustion gases coming from the furnace. The flue opens into a furnace for firing glass-making raw materials, see FIGS. 1 to 3.

In one embodiment, a combined glass and stone furnace is provided. "Stone furnace" means a furnace for firing stone, such as limestone, dolomite, flint, hydrated alumina, capable of providing at the output of the firing a raw material, in particular entering into the composition of the glass.

In one embodiment, a facility comprises an industrial glass-making furnace comprising a tank for melted glass, a combustion heating chamber located above the tank, and a duct for evacuating the flue gases in communication with the heating chamber, and a stone furnace comprising a zone for firing stone to be fired, the duct for evacuating the flue gases comprises a flue-gas output connected to the zone for firing stone to be fired supplying the zone for firing stone to be fired with flue gases at high temperature.

The stone furnace operates with cross-flow. The stone to be fired is loaded into the top of the stone furnace and descends while being transformed under the effect of the heat. At the bottom of the stone furnace the lime, the magnesia, the fragmented silica, the dehydrated alumina, etc. are recovered. The hot gases are introduced into the stone furnace. The thermal energy of the hot gases is transferred to the stone being fired. The output temperature of the gases can be low. An excellent energy recovery is carried out by recovery of the unavoidable energy.

At the temperatures provided in the stone furnace:
The limestone is transformed into lime by calcination with release of $CO_2$.
The dolomite is transformed into a combination of magnesium oxide and calcium oxide by calcination with release of $CO_2$.
The flint comprises in general approximately 90% silica, and approximately 10% compounds of Mg, Ca, Al and/or Na. These species are involved in the manufacturing of the glass. The flint brought to high temperature becomes friable and is fragmented. On the contrary, non-fired flint has a high hardness making it difficult to crush. However, a millimetric particle size is required for faster melting. River, sea or quarry flint can be used for firing—the hydrated alumina is dehydrated at high temperature.

Moreover, a part of the output gases can be sent into the stone furnace and the rest into a tandem alternating recuperator. The production of lime can be adapted to the demand.

Another unexpected advantage appeared. In the present facility, the chlorine present in the flue gases can be deposited on the surface of the stone to be fired and be recycled in the glass-making furnace. The chlorine can be present associated with the lime in the form of calcium chloride and with the magnesia in the form of magnesium chloride. Chlorine is a refining agent that favors the degassing of the melted glass.

Sulphur is a better refining agent than chlorine. The sulfur present in the flue gases can be deposited on the surface of the stone to be fired and be recycled in the glass-making furnace. The sulfur can be present in the form of calcium sulphate, magnesium sulphate or sodium sulphate. The recycling of the sulfur into a sulphate associated with the fired stone allows to reduce by approximately 50% the supply to the glass-making furnace of sulfate, in particular of calcium sulphate. Moreover, the treatment of the flue gases before their release into the atmosphere is make simpler or even useless.

The facility allows recycling via its properties of (i) self-neutralization of the acid species present in the flue gases and (ii) self-cleaning limiting the operations of maintenance on the flue-gas ducts.

Said stone furnace or an additional stone furnace can also be used for the production of oxides of magnesium and of calcium. This mixture is thus produced by calcination of the dolomite. The implementation of said mixture of oxides of magnesium and of calcium allows to reduce the loss, in particular the release of $CO_2$.

In one embodiment, said flue-gas output is arranged in a flue of the duct for evacuating the flue gases. The flow rate of flue gases in said flue-gas output can be controlled.

In one embodiment, the capacity of the glass-making furnace is greater than 10 tons of glass per day. The furnace is of the industrial type.

In one embodiment, the facility comprises at least two glass-making furnaces and a stone furnace. The stoppage of the glass-making furnaces can be offset to ensure a continuity of heating of the stone furnace. The facility can also comprise a recuperator of energy from the flue gases in the case of the oxidizing air.

In one embodiment, the facility comprises a glass-making furnace, a stone furnace and a booster burner capable of heating the stone furnace. Sustained and constant production by the stone furnace is obtained.

In one embodiment, the firing zone is tubular, a zone for supplying stone to be fired being disposed above and a zone for removing fired stone being disposed below. In a conventional furnace, the fired stone is cooled by the oxidizing air introduced from below. Here, a slight vacuum is regulated in the zone for removing fired stone in order to avoid the exhaust of flue gases via the bottom. A rising flow of air is thus provided. In the case in which the flue gases are at a temperature that is too high, for example for the coating of the stone furnace, a greater vacuum is regulated, resulting in a dilution of the flue gases in the firing zone and a lowering of temperature.

In the contrary case in which it is desired to keep the temperature of the firing zone at a high value, a bypass for the air that entered via the zone for removing fired stone and is located at the bottom of the firing zone is put in place. The bypass can be directed towards the air input of the glass-making furnace. The bypass can be directed towards an input of a regenerator allowing to limit its cooling during its operation of supplying the glass-making furnace. The bypass can be directed towards a zone of the stone furnace located above the firing zone.

In one embodiment, a method for firing stone to be fired is provided:
stone to be fired is introduced into a zone for firing stone to be fired, and
the firing zone is supplied with flue gases coming from the combustion coming from a duct for evacuating the flue gases mounted downstream of a combustion heating chamber of an industrial glass-making furnace comprising a tank for melted glass and said duct for evacuating the flue gases in communication with the heating chamber during the heating of the glass-making furnace.

In one embodiment, the stone to be fired is chosen from limestone, dolomite, flint or hydrated alumina. The firing of the limestone and of the dolomite is a calcination, that is to say a release of $CO_2$ or carbonate removal. The firing of the flint is a thermal fragmentation. The firing of the hydrated alumina is a desiccation by elimination of the bonded water.

During the rise in temperature of the stone to be fired, there is an elimination of the free water then of the bonded water, then decomposition of the carbonates into oxides and $CO_2$. In a lime kiln with natural-gas combustion, the fuel is introduced into one or more combustion zones of the lime kiln and the oxidizing air is partially introduced from the bottom in the zone for removing the lime and/or in the combustion zone(s).

Here, the stone furnace uses hot gas. The hot gases are introduced in a zone located at approximately ⅔ of the height of the stone furnace.

A stone furnace having a height between 20 and 30 m and an inner diameter of 3 to 5 m, with a firing zone 3 to 4 m in height, can be provided.

In one embodiment, the maximum temperature inside the zone for firing stone to be fired is greater than 900° C., preferably greater than 1000° C. The carbonate removal occurs rapidly.

In one embodiment, the firing of the stone to be fired lowers the temperature of the flue gases to less than 300° C., preferably less than 200° C. The flue gases exit at 100° C. or slightly more via the throat of the stone furnace. The energy losses are very low and the condensation of the water vapor coming from the flue gases and from the desiccation of the stone to be fired is avoided.

In one embodiment, the temperature of the flue gases is lowered by more than 900° C., preferably by more than 1100° C., more preferably by more than 1200° C. The flue gases can enter the stone furnace at more than 1300° C., for example approximately 1500° C. The power recovered can be between 10 and 30 kW in a furnace, per ton of daily glass production.

In one embodiment, the stone to be fired resides in the zone for firing stone to be fired for a time between 1 and 4 h and in the stone furnace for 12 to 36 h.

In one embodiment, the stone to be fired is moved counter-current to the combustion gases.

In one embodiment, the flue gases comprise chlorinated components and said chlorinated components are trapped on the stone to be fired in the case of use of dolomite and of limestone. At the output a mixture of oxides of magnesium and of calcium or a lime with a concentration of chlorides compatible with a glass-making use is obtained.

In one embodiment, the flue gases comprise sulphurated components, and said sulphurated components are trapped on the stone to be fired, in particular in the case of use of dolomite and of limestone. At the output of the stone furnace, a stone composed in particular of oxides of magnesium and of calcium or of lime, with a concentration of sulphates compatible with a glass-making use, is obtained.

The stone furnace is thus self-neutralizing and self-cleaning for the flue gases having a concentration of S and Cl that requires in normal conditions a specific treatment. A treatment of neutralization of the flue gases is useless.

In one embodiment, the glass obtained in the industrial glass-making furnace is soda-lime, borosilicate, aluminosilicate, quartz or vitro-ceramic.

The applicant carried out trials of calcination of limestone in the flue of an operating industrial glass-making furnace. The mass of the samples of limestone was from 396 to 633 grams. The temperature at the beginning of calcination was between 1240 and 1340° C. The temperature at the end of calcination was between 1290 and 1380° C. The $CaCO_3$ $CaO+CO_2$ calcination reaction leads to a theoretical mass loss of 43%. The calcination times of less than 1 hour produce mass losses that are too low indicative of incomplete calcination. A calcination of one hour produces a mass loss of 42.1%. A calcination of 1.75 to 2.25 hours produces a mass loss of 43.7 to 44% translating a complete calcination and a slight loss of material upon recovery of the sample. The loss is related to the conditions of the trial and can be avoided in an industrial method. The output flue gases of the glass-making furnace allow the calcination of the limestone. The other stones to be fired can comprise dolomite, flint, hydrated alumina.

The glass-making furnace 1 comprises a tank 2 for melted glass 33 for batch production. The glass-making furnace 1 comprises a combustion chamber 3 located above the bath of melted glass 33 and an upper wall 5 composed of a crown 5a and of vertical parts called side walls (length) or walls (width) 5b defining the combustion chamber 3. The glass-making furnace 1 comprises at least one burner 6 supplied with fuel oil or gas and an oxidizer input 7. The oxidizer can be air, cf. FIG. 1, or oxygen, cf. FIG. 2.

The tank 2 and the upper wall 5 are made from refractory materials, reinforced by an outer metal structure distant from the high-temperature zones. The burner 6 has a flame oriented horizontally in the combustion chamber 3. The glass-making furnace 1 comprises a flue-gas output 8 arranged in one of the vertical walls 5b above the bath of melted glass. The burner 6 and the flue-gas output 8 can be provided on the same small side in such a way that the flame and the flue gases carry out a U-shaped trajectory in the combustion chamber 3. The glass-making furnace 1 can be an end-fired furnace.

Downstream of the glass-making furnace 1 in the direction of movement of the flue gases, the facility comprises a flue 10. The flue 10 is a substantially horizontal duct for flue gases. The flue 10 is in fluid communication with the combustion chamber 3 by the flue-gas output 8. The flue 10 is made from refractory materials reinforced by an outer metal structure distant from the high-temperature zones. The flue 10 is provided with a branching and has two outputs. The flue 10 does not have a valve.

Downstream of the glass-making furnace 1 in the direction of movement of the flue gases, the facility comprises a stone furnace 11. The stone furnace 11 can be a lime kiln. The stone furnace 11 has a structure oriented vertically. The stone furnace 11 has a shape of revolution. The stone furnace 11 is made from refractory materials reinforced by an outer metal structure distant from the high-temperature zones. The stone furnace 11 can have a height of 25 m and a diameter of 4 m for example. The stone furnace 11 comprises a chamber 12 having a vertical axis, a lower opening 13 and an upper opening 14 or throat. The lower opening 13 allows the removal of the fired stone and the introduction of air in a quantity allowing to avoid an output of flue gases via said lower opening 13.

The upper opening 14 allows the introduction of the stone to be fired, for example via a door 15 and the output of the flue gases. The upper opening 14 can be provided with a separator to, on the one hand, treat the flue gases, in particular remove dust therefrom in a filter 16, and, on the other hand, supply the stone furnace 11 with stone to be fired. Downstream of the filter 16 there is a chimney 17 capable of evacuating the flue gases free of dust and cooled. Downstream of the filter 16, the flue gases can be released into the atmosphere while the filter directly receives the flue gases coming from the stone furnace 11 or from an energy recuperator.

The chamber 12 has an overall sealed structure. The chamber 12 comprises a preheating zone 20 neighboring the upper opening 14, a firing zone 21 located under the preheating zone 20 and a cooling zone 22 located under the firing zone 21 and neighboring the lower opening 13. Between the firing zone 21 and the cooling zone 22, the chamber is provided with an opening 23 in fluid communication with one of the outputs of the flue 10. The cooling zone 22 has a height of 55 to 75% of the height of the chamber 12. The firing zone 21 has a height of 5 to 20% of the height of the chamber 12. The preheating zone 20 has a height of 10 to 25% of the height of the chamber 12.

The facility also comprises a heat exchanger 25 in fluid communication with the other of said outputs of the flue 10. The heat exchanger 25 transfers the heat energy of the flue gases towards the air supplying the glass-making furnace 1. The transfer can be via heat-conducting plates in the case of a recuperator. The transfer can be via intermediate heat storage in materials having a high heat capacity in the case of a regenerator. Flows of flue gases and of oxidizing air alternate, one heating, the other cooling the regenerator, via mobile shutters.

The heat exchanger 25 is provided with an input 26 of ambient air and with an output 27 of hot air. The hot-air output 27 is connected by a pipe 28 to the oxidizer input 7. The heat exchanger 25 is provided with an input 29 for hot flue gases supplied by the other of said outputs of the flue 10 and with an output 30 for cooled flue gases opening towards the filter 16.

Figure 2:
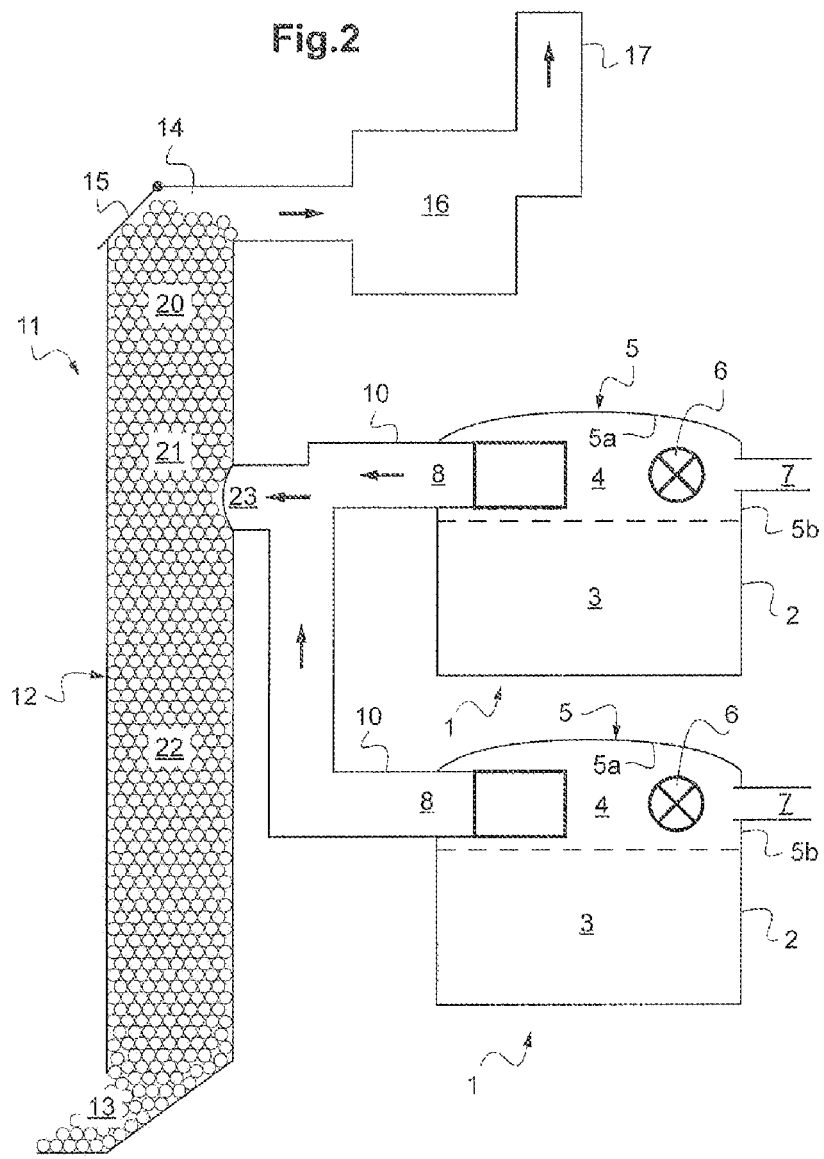
FIG. 2 is a cross-sectional view of a combined facility according to another aspect of the invention.

In the embodiment illustrated in FIG. 2, the glass-making furnace is a gas-oxygen furnace, that is to say with a fuel gas, in general methane, and oxidizing oxygen. The flow rates of gas at the input and at the output are thus reduced, in particular by 80% at the input of the oxidizer because of the absence of nitrogen contained in the air. Therefore, the concentration of NOx can be divided by 3. The flue gases are composed substantially of water vapor coming from the combustion of the gas and carbon dioxide coming from the combustion of the gas and from the degassing of the glass, as well as other degassing gases. Since the flow rate of flue gases is less than in the previous embodiment, at least two glass-making furnaces 1 and a stone furnace 11 can be coupled.

Figure 3:
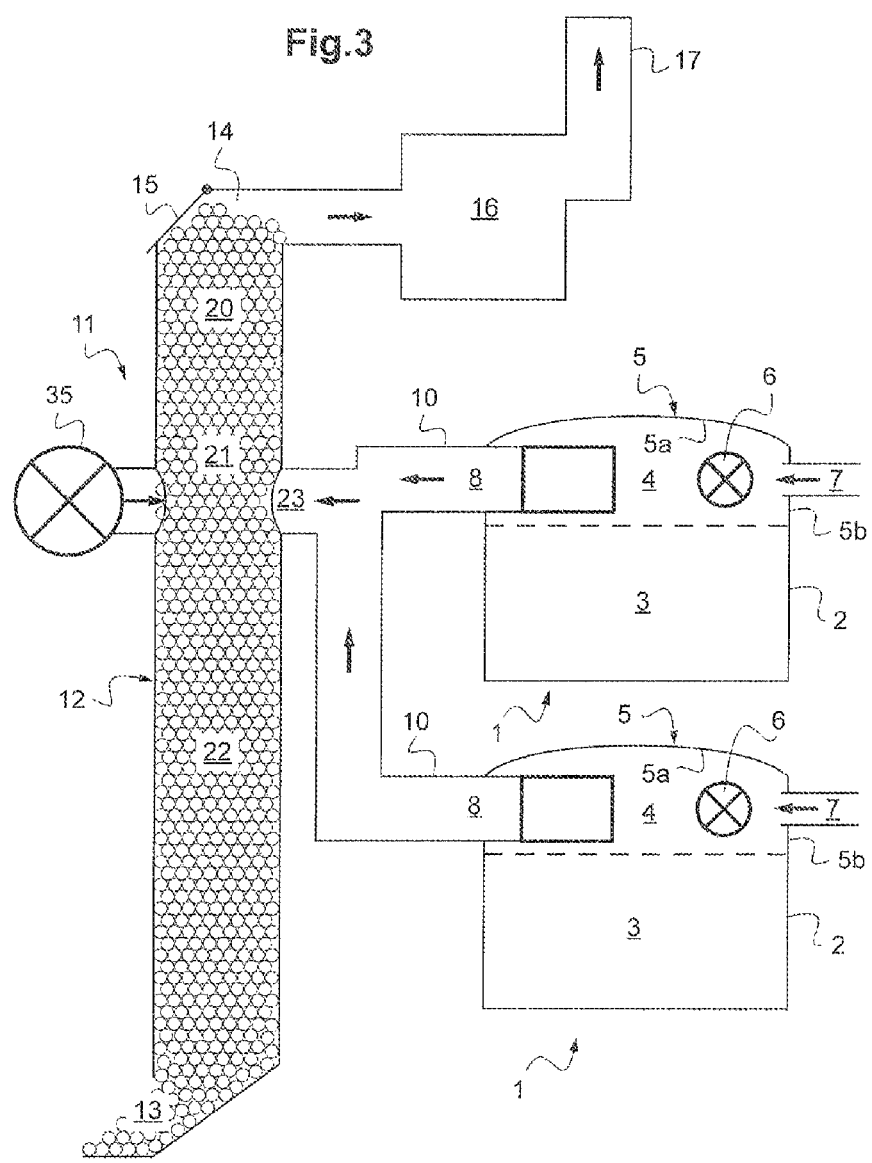
FIG. 3 shows an alternative of FIG. 2.
Figure 7:
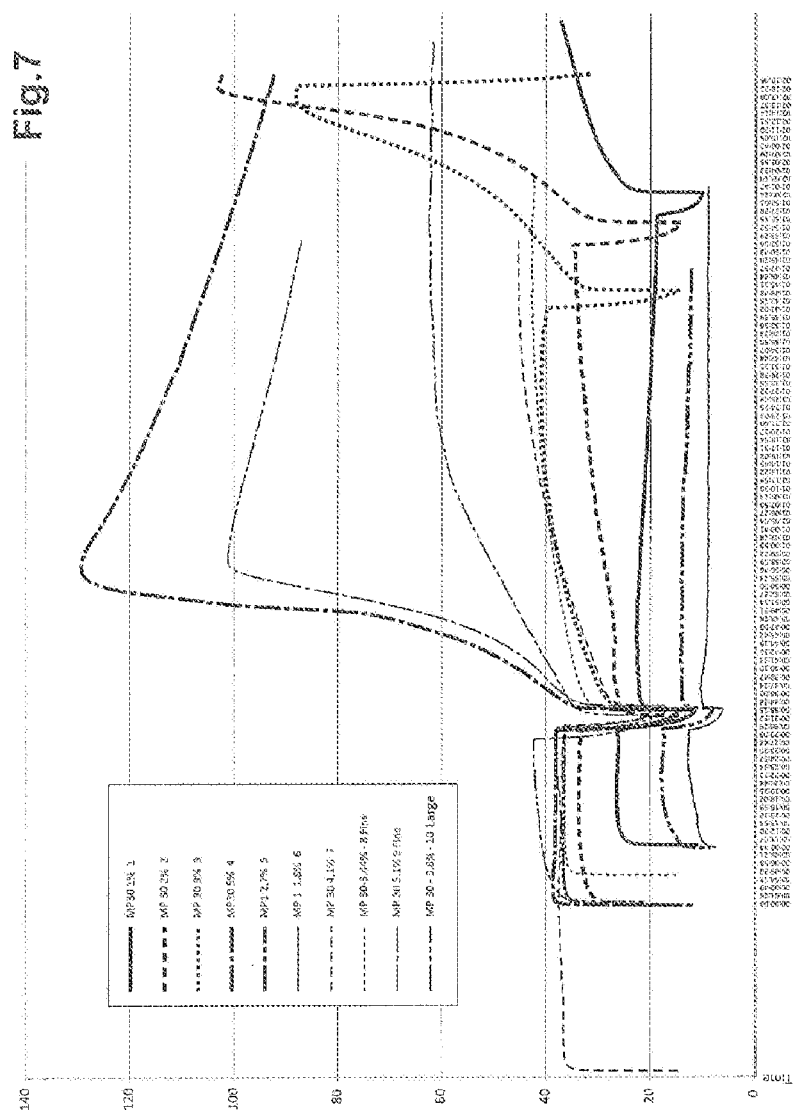
FIG. 7 shows several curves of heating according to the time for ten trials according to the temperature of the raw materials, the humidity, the delay between the premixing and the introduction of the quick lime, and the particle size of the sodium carbonate.
Figure 8:
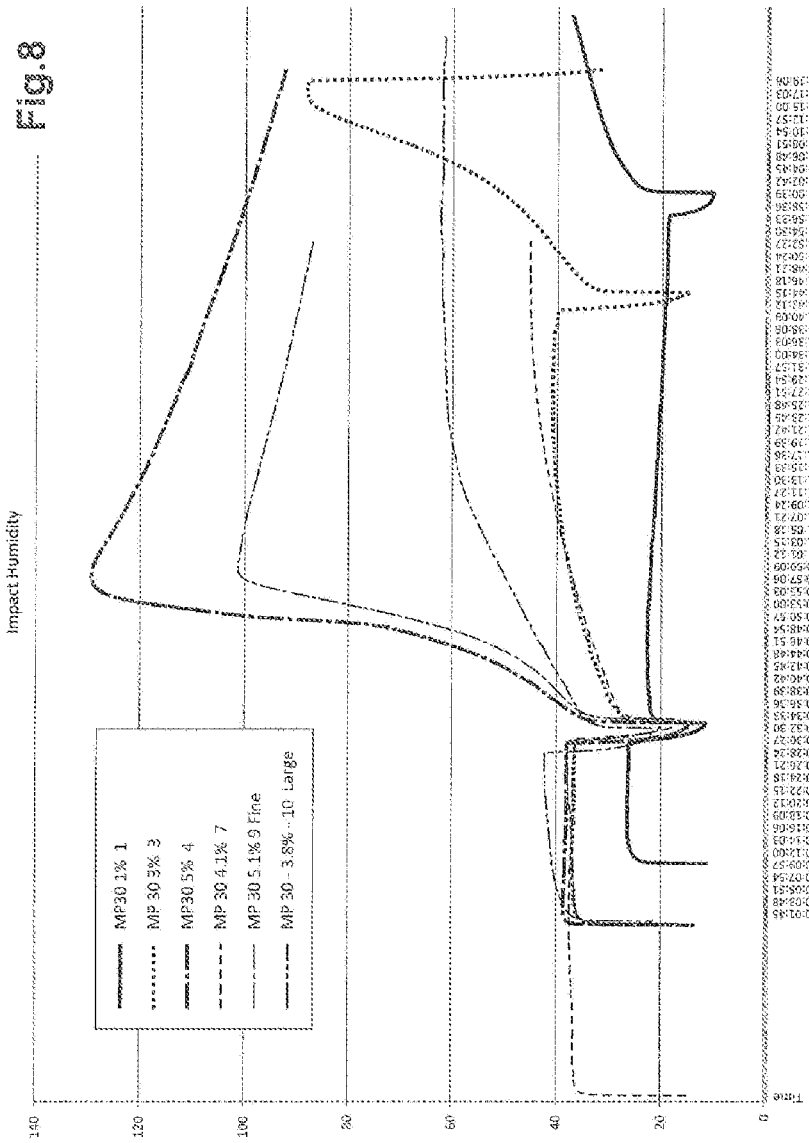
FIG. 8 shows a selection of the curves of FIG. 7 based on the humidity parameter.
Figure 9:
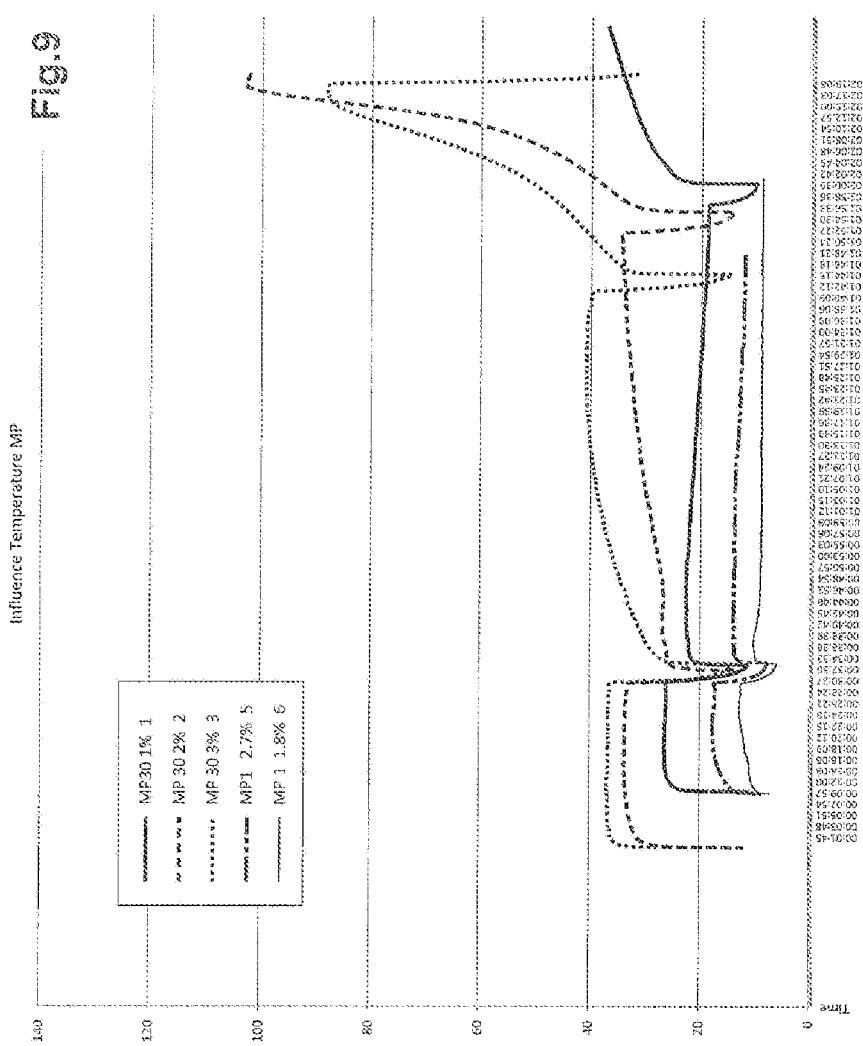
FIG. 9 shows a selection of the curves of FIG. 7 based on the temperature parameter.
Figure 10:
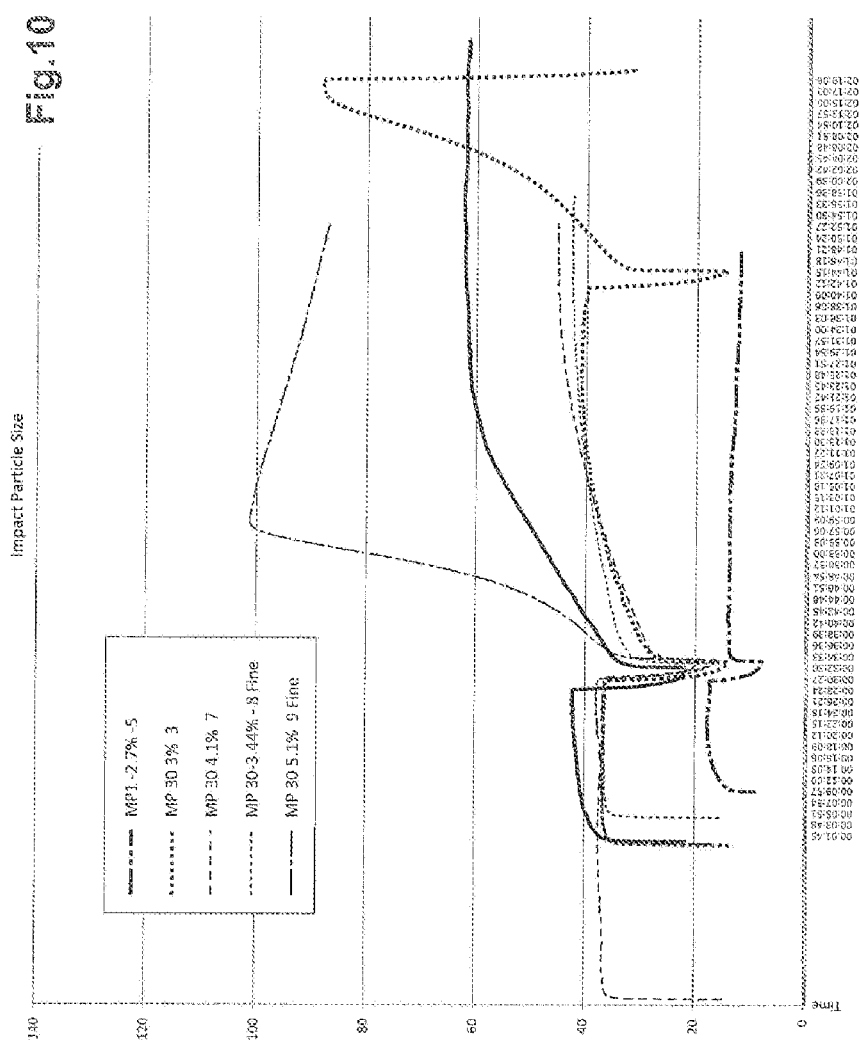
FIG. 10 shows a selection of the curves of FIG. 7 based on the particle size of the sodium carbonate parameter.

In the embodiment illustrated in FIG. 3, a booster burner 35 is provided in the stone furnace 11 while consuming the air rising in the cooling zone 22 or next to the stone furnace 11 providing an additional flow of flue gases at high temperature.

In the above embodiments, the flue gases exit the stone furnace at low temperature, while having lost a significant portion of the chlorides and sulphates that said flue gases contained at the output of the glass-making furnace. There is therefore a neutralization and cleaning of the flue gases to the point that the neutralization of the flue gases downstream becomes useless. The neutralization produces CaCl2 and CaSO4 compounds in the case of lime, MgCl2 and MgSO4 in the case of dolomite, remaining in the fired stone. These compounds provide a supply of chlorides and sulphates in the glass bath.

The invention is of greater interest when the glass-making furnace produces a grade of glass requiring a high temperature, in particular borosilicate, for example Pyrex®, or 15 vitro-ceramics.

In other words, the stone to be fired comprises at least one out of: limestone, dolomite, flint or hydrated alumina. The stone to be fired is introduced into the stone furnace via the top and starts a descent leading it after firing to exit by the bottom of the stone furnace while having passed through the chamber therein. The chamber comprises a preheating zone, a firing zone and a cooling zone in this order in the direction of descent of the stone.

The gases passing through the chamber are rising. Said gases can comprise ambient air entering via the bottom and exiting either at the top of the stone furnace, or at the top of the cooling zone. Said gases comprise combustion flue gases. The combustion flue gases enter at the bottom of the zone for firing stone to be fired. The combustion flue gases pass through the firing zone and the preheating zone. The combustion flue gases come from a duct for evacuating the flue gases mounted downstream of a combustion heating chamber of an industrial glass-making furnace. The industrial glass-making furnace comprises a tank for melted glass and said duct for evacuating the flue gases at the output of the heating chamber during the heating of the glass-making furnace. The combustion flue gases are at a temperature between 1300 and 1500° C. at the output of the heating chamber. The flue gases at the output of the stone furnace are at a temperature between 100 and 200° C., preferably between 100 and 150° C.

The effect of the introduction of calcium oxide into the mixture as a replacement for the calcium carbonate is described below.

The applicant carried out trials. The replacement of the limestone by quick lime in the materials for manufacturing the glass poses difficulties, in particular related to the reactivity of the lime with the humidity of the air. The economic results of lime are less favorable than those of limestone despite a reduced transported and handled tonnage. Moreover, a lime with a large particle size is slow to melt in the glass-making bath and can leave batch stone. A lime with a small particle size generates carryover driven by the combustion gases. A part of the lime is lost and plugs the flue-gas ducts downstream of the furnace.

Despite these obstacles, the applicant continued and developed a glass precursor mixture. A difficulty arose during the preparation of the mixture. In the absence of water, the powdery mixture does not hold and generates carryover in large quantities. But water and lime react together exothermically. The temperature reached makes the mixture difficult to handle.

The applicant developed a method for preparing a precursor mixture providing a mixture with low heating and low generation of carryover. The particle size of the components supplied to the mixture is substantially preserved with the exception that the mechanical manipulations of transfer can generate a grinding effect slightly reducing the particle size. Said mixture introduced into a glass-making furnace allows a reduction in the energy necessary for the production of glass and in the quantity of CO2 released of approximately 3 to 6%. Moreover, the duration of the melting of the mixture is less than the duration observed during the use of calcium carbonate. This results in an increase in the productivity of the furnace, also translating into an additional decrease in the energy consumption of approximately 4 to 6%.

In one embodiment, a method for manufacturing glass comprises the preparation of a glass precursor mixture for a glass-making furnace, wherein water, sand and sodium carbonate are mixed in weight proportions of between 0 and 5%, 40 and 65%, and more than 0 and at most 25%, respectively, and, after a delay of at least 10 minutes and of less than one hour, calcium oxide is supplied in a weight proportion of between 1 and 20% of the total.

In one embodiment, a method for manufacturing glass comprises the preparation of a glass precursor mixture for a glass-making furnace, wherein water, sand and sodium carbonate are mixed in weight proportions of between 0 and 5%, 40 and 65%, and more than 0 and at most 25%, respectively, and, after a delay of at least one hour, calcium oxide is supplied in a weight proportion of between 1 and 20% of the total. The preparation of the precursor mixture does not experience spontaneous heating that is significant or at least capable of presenting a disadvantage. The delay in the supply of calcium oxide leaves time for the sodium carbonate to trap the available water, in particular in the sand. The applicant realized the interest of not having a chemical reaction involving the lime before the charging.

In one embodiment, the weight proportion of water is between 1.5 and 3%. The risk of generating carryover, even with mixture fractions having a small particle size, is reduced.

In one embodiment, said delay is at least one hour.

In one embodiment, said delay is between at least 10 minutes and less than one hour for a mixture of water, sand and sodium carbonate at at most 4.1% humidity.

In one embodiment, the sodium carbonate has a particle size with less than 5% passing through a screen of 0.075 mm, less than 15% passing through a screen of 0.150 mm and less than 5% not passing through a screen of 0.600 mm.

In one embodiment, said water, sand and sodium carbonate mixture has at most 3% humidity with sodium carbonate having a particle size for the most part greater than 0.500 mm and less than 1.000 mm.

In one embodiment, said water, sand and sodium carbonate mixture has at most 2% humidity with sodium carbonate having a particle size for the most part smaller than 0.250 mm.

In one embodiment, said delay is less than 72 hours.

In one embodiment, the initial temperature of the raw materials is at least 30° C. The speed of hydration of the sodium carbonate is increased.

In one embodiment, the calcium oxide has a particle size such that 70 to 90% by weight does not pass through a screen of 0.1 mm, preferably 30 to 80% by weight does not pass through a screen of 0.5 mm, more preferably 30 to 70% by weight does not pass through a screen of 2 mm. The generation of carryover is low.

In one embodiment, the calcium oxide has a particle size such that more than 90% by weight does not pass through a screen of 0.1 mm and less than 5% by weight does not pass through a screen of 4 mm, preferably more than 95% by weight does not pass through a screen of 0.1 mm and less than 1% by weight does not pass through a screen of 4 mm. The quantity of air introduced into the furnace with the mixture is small and the batch stone is rare.

In one embodiment, the calcium oxide has an average particle size between 1 and 1.5 mm.

In one embodiment, the precursor mixture is implemented in a glass-making furnace less than 1 hour after its preparation for a particle size of 90% or more by weight passing through a screen of 0.1 mm, preferably less than 2 hours after its preparation for a particle size of 70 to 90% by weight passing through a screen of 0.1 mm. A fine particle size is associated with high reactivity and fast implementation. The melting is thus fast.

In one embodiment, the precursor mixture is implemented in a glass-making furnace less than 8 hours after its preparation for a particle size of 70% or more by weight passing through a screen of 2 mm. An average particle size allows flexible implementation with storage times industrially of interest.

In one embodiment, said sand is dry. The quantity of water supplied is well controlled. In the alternative without supply of water, preferably associated with an average or large particle size, the energy consumed is reduced. The sand is considered to be dry at a humidity of less than 0.1%. The sand can be dried by heating to a temperature from 15 to 20° C. above the ambient temperature.

In one embodiment, the water is present in said sand, preferably 3 to 4% by weight. The cost of a voluntary supply of water is avoided.

In one embodiment, the calcium oxide is devoid of voluntary addition of aluminum oxide. Aluminum oxide can be supplied during the mixing of the water, the sand and the sodium carbonate.

In one embodiment, cullet is supplied to the glass precursor mixture, before or after the supply of calcium oxide, in a weight proportion of between 5 and 40% of the total. The cullet can come from rejected batches of glass. The batches have a known composition so that the quantities of the other raw materials are adjusted to the desired quality of glass.

In one embodiment, the glass precursor mixture is prepared in the solid state. The evaporation of the water in the case of a slurry is avoided. The energy consumption of a previous melting of the raw materials is avoided. In one embodiment, the glass precursor mixture is prepared at a temperature between the ambient temperature and the ambient temperature increased by 20° C.

In one embodiment, the glass precursor mixture is prepared at a temperature between +0 and +20° C. of the previous temperature of the water, of the sand, of the sodium carbonate and of the calcium oxide. A weighted average can be taken as the previous temperature.

In one embodiment, the glass precursor mixture is prepared without supply of thermal energy. A desiccation of the mixture, which generates fines and thus carryover, is avoided.

In one embodiment, said mixture is charged into an electric furnace.

In one embodiment, in a glass-making furnace, a mixture of water, sand, soda and calcium oxide is provided, the calcium oxide being in a weight proportion of between 1 and 20% of the total of the mixture, and the mixture is melted by at least one burner with a flame directed towards the mixture. Said burner provides a good yield and an effect of glazing of the carryover towards the surface of the melting or melted glass bath.

In one embodiment, the oxidizer provided to the burner is oxygen. The effect of glazing of the carryover is increased.

In one embodiment, the water, the sand, the sodium carbonate and the calcium oxide are present in weight proportions of between 0 and 5%, 40 and 65%, 1 and 25%, and 1 and 20%, respectively.

In one embodiment, the carbonate removal from the $Na_2CO_3$ is carried out in the glass-making furnace in liquid phase.

In one embodiment, an industrial glass-making furnace comprising a tank for melted glass, a combustion heating chamber located above the tank and defined by side walls, walls and a crown, a duct for evacuating the flue gases in communication with the heating chamber, a loop burner disposed in a direction parallel to the duct for evacuating the flue gases, and a burner with a flame directed towards the tank for melted glass.

In one embodiment, the burner with a flame is disposed in a crown of the furnace.

In one embodiment, the glass-making furnace is stationary. The fragility of rotary furnaces is avoided.

Trials reported below were carried out.

1) Temperature Trial on a Batch of Soda-Lime Glass Precursor Mixture

Raw materials for 20 kg of precursor mixture are weighed. The sand was dried then rewetted for a reproducible concentration of water. The other raw materials are added at once at the time t0. The mixing is carried out for 100 seconds in a concrete mixer. 16 kg are removed and placed in a closed container. The temperature is raised for 2 hours by a thermocouple positioned at the center of the batch in the closed container. The water is the same for the 5 batches. The sand and the sodium carbonate come from the same industrial batches from the same suppliers.

Five sources of calcium are compared:
Limestone
 White quick lime A delivered in bulk, D50 at 0.1 mm
 Brown quick lime B delivered in bulk, D50 at 0.1 mm
 Quick lime C delivered in large bags of approximately 1 ton, caliber 4/8 mm
 Quick lime D, D50 at 1.2 mm.

The notation D50 means that 50% of the material by weight has a smaller particle size and 50% a larger particle size. The caliber is a commercial notation indicating the preponderance of the particle size located in the range 4 to 8 mm.

The curves of FIG. 5 start at the time t=t0+5 minutes because of the time for filling the container, installing the thermocouple and closing the container. The curves show a rise in temperature of less than 5° C. with the limestone, of approximately 15° C. with the quick lime C delivered in large bags, of approximately 75° C. at t=t0+35 minutes with the quick lime D, of approximately 75° C. at t=t0+12 minutes with the white quick lime A delivered in bulk, of more than 90° C. at t=t0+30 minutes with the brown quick lime B delivered in bulk.

The low heating with the quick lime C can be explained by the very large particle size and by a prior taking up of humidity having in part hydrated the lime and making a possible energy gain be lost. A slaked lime introduced into the glass-making furnace is dehydrated under the effect of the heat, which affects the energy balance by the energy necessary for the dehydration and the energy heating the additional water to the temperature of the furnace. However, a lime with a large particle size is less subject to involuntary hydration and the hydration is slower than with a lime having a small particle size.

The differences in heating and heating times between the white and brown quick limes A and B delivered in bulk is explained by a different composition without being highly significant.

The three batches of trials having undergone high heating provide a mixture generating a lot of carryover, that is to say dust in part lost by the suction of the chimneys and not participating in the glass obtained. Moreover, the high heating makes the mixture difficult to handle for several hours. This high heating could be taken advantage of to charge a hot mixture and improve the heat balance of the glass-making furnace. The gain would be approximately 1 to 1.5%.

2) Trial of Phasing the Same Mixture

After an unexpectedly interrupted manipulation, the lime was introduced into the mixture with a delay. The mixing of the water, the sand and the sodium carbonate was carried out. The sand and the sodium carbonate come from the same industrial batches as in the first trial. The lime has a caliber of 0/5 mm. The lime was added 5 hours later and the rest of the trial carried out as above. No heating was noted, see the lower curve of FIG. 6.

Given this result, the applicant carried out two other trials while incorporating for one the same lime into a water, sand and sodium carbonate premix and for the other while incorporating a water, sand and sodium carbonate premix into the same lime without a delay between the manufacturing of the premix and the incorporation, see the upper curves of FIG. 6. There is therefore significant heating in both cases, of approximately 40° C. The notion of "same" lime here is a lime from the same delivery from a manufacturer, thus having a very close particle size, a caliber of 0/3 mm, and identical storage conditions. The lime comes from sample n° 1 of the table in chapter 4. A waiting time in the preparation of the mixture with a delay in the introduction of the lime is of interest to avoid the heating. The batch of mixture without heating was then loaded into a glass-making furnace. The proportion of carryover was comparable to that of a glass made from limestone.

3) Charging Trials

Using the same composition of soda-lime glass, the applicant sought to compare particle sizes of different limes in the same furnace. The other raw materials are identical from one trial to the other. A lime with a caliber of 0/5 mm provided a production of glass of 23 tons/day and a lime with a caliber of 2/6 mm from the same supplier provided a production of glass of 20.5 tons/day. Said limes come from samples no. 4 and 6 of the table in chapter 4, respectively. A fine lime melts faster in the furnace than a coarse lime but contains more air. The air must be evacuated from the melting glass by a longer degassing.

Moreover, the applicant prefers a lime containing as many particles as possible having a particle size greater than 0.1 mm to avoid carryover, less than a maximum value between 4 and 6 mm for fast melting, and relatively spread out between these endpoints to reduce the quantity of air charged and needing to be degassed from the glass.

In the glass-making furnace, the mixture melted faster than a mixture having an equivalent particle size containing limestone, having a composition leading to substantially identical glass. This acceleration translates into an increase in the daily production of a furnace by approximately 22%.

In trials carried out in the same laboratory furnace in the absence of dolomite, samples of melting glass were taken at intervals of 30 minutes in the furnace. Two batches of glass having the same composition containing the same limestone required 2 h30 m and 3 h of heating to have proper melting. The samples prior to these durations have batch stone and, after cooling, break into a powder. A batch of glass having the same composition containing the same limestone previously calcined at 1000° C. with a loss on ignition of 43.5%, having a particle size of 0.1/2 mm and a batch of glass having the same composition containing quick lime C. The quick lime C comprises by weight: CaO 97.1%, MgO 1.8%, $SiO_2$ 0.5%, $Al_2O_3$ 0.2% and $Fe_2O_3$ 0.16 ppm. The quick lime C has a particle size of more than 50% not passing through a screen of 3.15 mm; 18% not passing through a screen of 2 mm after passing through a screen of 3.15 mm; 18% not passing through a screen of 2 mm after passing through a screen of 3.15 mm; less than 5% not passing through a screen of 1.6 mm after passing through a screen of 2 mm; less than 5% not passing through a screen of 0.8 mm after passing through a screen of 1.6 mm; less than 5% not passing through a screen of 0.5 mm after passing through a screen of 0.8 mm; less than 5% not passing through a screen of 0.315 mm after passing through a screen of 0.5 mm; less than 5% not passing through a screen of 0.2 mm after passing through a screen of 0.315 mm; less than 5% not passing through a screen of 0.1 mm after passing through a screen of 0.2 mm; less than 10% not passing through a screen of 0.08 mm after passing through a screen of 0.1 mm; less than 5% passing through a screen of 0.8 mm. The last two batches of glass provided glass having suitable quality after 2 h of heating.

The absence of dolomite is a simplification not capable of changing the observation of the reduction in melting time.

4) Measurement of Particle Size

| SCREEN mm | Lime no 1 % rejection | Lime no 2 % rejection | Lime no 3 % rejection | Lime no 4 % rejection | Lime no 5 % rejection | Lime no 6 % rejection | Lime no 7 % rejection | Lime no 8 % rejection |
|---|---|---|---|---|---|---|---|---|
| 4.000 | 0 | 0 | 0 | 3.3 | 19.6 | 6.9 | 17.8 | 24.4 |
| 3.150 | 0 | 0 | 0.1 | 2.3 | 25.1 | 10.7 | 18.3 | 19.3 |
| 2.000 | 18.1 | 15.9 | 6.9 | 9.1 | 35.4 | 22.9 | 25.6 | 21.8 |
| 0.800 | 37.2 | 32.7 | 22.9 | 20.1 | 8.1 | 19.4 | 13.6 | 11.3 |
| 0.500 | 10.9 | 10.5 | 11.5 | 8.8 | 1.2 | 5.5 | 3.2 | 2.6 |
| 0.400 | 3.9 | 3.5 | 4.5 | 3.5 | 0.3 | 1.9 | 1.1 | 1.0 |
| 0.200 | 9.7 | 19.8 | 15.7 | 10.5 | 0.9 | 5.3 | 3.1 | 3.0 |
| 0.100 | 8.3 | 13.5 | 27.9 | 23.3 | 1.0 | 7.9 | 10.9 | 8.8 |
| Rest | 20.8 | 4 | 9.9 | 18.5 | 8.2 | 19.3 | 6.2 | 7.6 |

| SCREEN mm | Lime no 9 % rejection | Lime no 10 % rejection | Lime no 11 % rejection | Lime no 12 % rejection | Lime no 13 % rejection | Lime no 14 % rejection | Lime no 15 % rejection | Lime no 16 % rejection |
|---|---|---|---|---|---|---|---|---|
| 4.000 | 29.5 | 4.0 | 0.2 | 0.1 | 1.3 | 0.8 | 0.9 | 0.9 |
| 3.150 | 21.5 | 3.4 | 1.3 | 0.5 | 1.0 | 0.8 | 1.4 | 1.3 |

-continued

| | | | | | | | | |
|---|---|---|---|---|---|---|---|---|
| 2.000 | 22.4 | 15.0 | 4.3 | 9.1 | 10.0 | 2.9 | 5.5 | 3.9 |
| 0.800 | 15.2 | 32.8 | 13.1 | 26.7 | 29.8 | 12.7 | 15.3 | 14.6 |
| 0.500 | 2.6 | 12.9 | 8.2 | 14.6 | 14.9 | 9.7 | 10.1 | 9.8 |
| 0.400 | 0.7 | 4.2 | 3.6 | 5.5 | 4.4 | 3.9 | 3.6 | 3.9 |
| 0.200 | 1.8 | 10.1 | 12.2 | 16.9 | 13.0 | 13.2 | 14.2 | 11.8 |
| 0.100 | 4.2 | 13.8 | 34.9 | 12.6 | 13.6 | 24.8 | 31.7 | 40.8 |
| Rest | 2.1 | 3.6 | 22.0 | 14.0 | 11.9 | 30.5 | 17.2 | 11.8 |

These measurements of particle size show that this parameter changes according to the conditioning of the lime—large bags, in bulk, etc.—the handling and the movement of the lime, and the storage time conditions. The desired particle size comprises as many particles between 0.1 mm and 4 mm as possible, for example 90% by weight does not pass through a screen of 0.1 mm and less than 5% by weight does not pass through a screen of 4 mm. A preferred particle size is: more than 95% by weight does not pass through a screen of 0.1 mm and less than 1% by weight does not pass through a screen of 4 mm.

5) Quantity of Carryover

The flue of an industrial glass-making furnace was provided with a bypass allowing to recover and weigh a part of the carryover. The same bypass device was used during the campaign of trials. The trials were carried out with the same raw materials at the input except for the change of the limestone to CaO and obtaining a glass having the same composition at the output and over a duration of 24 h. A first series of trials was carried out with a conventional mixture comprising limestone and an end-fired furnace with a crown burner. A second series of trials was carried out with a mixture comprising the lime no 4 and the end-fired furnace with a crown burner. The composition of the mixture is 1367 kg of sand, 112 kg of dolomite, 416 kg of sodium carbonate, 4 kg of sodium sulphate, 160 kg of quick lime, 30 kg of alumina. The quantities of carryover recovered constitute relative measurements for comparison among them. They were not expressed per ton of glass produced. They are gross values in grams:

Series no 1: average: 43.15; mean deviation: 14.65. The dust collected is due to two effects: the take-off of particles and the vaporization then recondensation of the gaseous species on the cold finger that was placed in the flue to collect the dust. This second effect was identified by the applicant.

Series no 2: average: 45.2; mean deviation: 7.85. The analysis carried out for series n° 1 applies. The flue did not need to be cleaned during a campaign of eleven months. The dust recovered contains for the most part sodium sulphate that is easier to clean than the calcium sulphate usually found in the flue. It is deduced therefrom that the loss of Ca by carryover is reduced.

In conclusion, the measurement of the quantity of particles in the flue is difficult and interpretation is necessary. In the conditions of the trial, the use of CaO coming from calcination of the limestone does not generate the same carryover of particles in the furnace as the use of CaCO3 with the crown burner.

After their trials, the applicant developed the preparation of a glass precursor mixture for a glass-making furnace, wherein, first of all, water, sand and sodium carbonate are mixed in weight proportions of between 0 and 5%, 40 and 65%, and more than 0 and at most 25%, respectively, and, secondly, calcium oxide is added in a weight proportion of between 1 and 20% of the total. The supply of CaO is carried out at least one hour after the first mixture. The materials are at ambient temperature. The water is absorbed by the sodium carbonate and becomes not very available for the CaO.

The water allows lesser sensitivity to carryover by an effect of cohesion on the fine particles.

The precursor mixture contains for a soda-lime glass: water 0 to 3%, sand 65 to 75%, sodium carbonate 10 to 15%, lime 10 to 25%, magnesia 0 to 6%, refining agents, colorants and decolorizing materials 0 to 2%.

A borosilicate glass contains: 7 to 13% boron trioxide ($B_2O_3$), 4 to 8% alkali oxides ($Na_2O$; $K_2O$), 2 to 7% alumina ($Al_2O_3$), 0 to 5% other alkali oxides (CaO, MgO . . . ). A borosilicate glass containing CaO can be manufactured from a precursor mixture according to the invention.

The glass-making furnace 1, illustrated in FIG. 4, has at least one loop burner and at least one crown burner. The loop burner is oriented substantially horizontally, near an oxidizer input. The flame extends substantially horizontally above the bath. The bath is composed at the beginning of the heating of the raw materials to be melted, that is to say of the glass precursor mixture, then of melted glass being created, progressively transformed into industrial glass having the desired quality. The crown burner is oriented substantially vertically in a top wall of the furnace. The flame extends substantially vertically towards the bath.

The glass-making furnace 1 comprises a tank 2 for melted glass. The glass-making furnace 1 comprises a combustion chamber 3 located above the bath of melted glass and an upper wall 4 composed of a crown 5a and of vertical parts called side walls (length) or walls (width) 5b defining the combustion chamber 3. The glass-making furnace 1 comprises at least one loop burner 6 supplied with fuel oil or gas. The glass-making furnace 1 comprises at least one crown burner 38 supplied with fuel oil or gas. The glass-making furnace 1 comprises an oxidizer input 7. The oxidizer can be air and/or oxygen.

The burner 38 is installed in the crown 5a. The burner 38 has a flame directed towards the upper surface of the bath, downwards from above. The burner 38 is positioned in such a way that its flame is located outside of the zone in which the movement of gas generated by the burner 6 is maximum. The burner 38 is positioned substantially at the top of the crown 5a. The burner 38 is positioned substantially in the middle of the furnace 1 in the direction of the width.

In one of the side walls, an opening or niche 36 is arranged allowing the supply of the furnace 1 with raw materials to be melted, in particular precursor mixture. The members for removal of the refined glass have not been shown.

The tank 2 and the upper wall 4 are made from refractory materials, reinforced by an outer metal structure distant from the high-temperature zones. The burner 6 has a flame oriented horizontally in the combustion chamber 3. The burner 6 is installed under the oxidizer input 7.

The glass-making furnace 1 comprises a flue-gas output 8 arranged in one of the vertical 5b walls 30 above the bath of melted glass. The burner 6 and the flue-gas output 8 can be provided on the same small side in such a way that the flame of said burner 6 and the flue gases carry out a U-shaped trajectory in the combustion chamber 3. The U-shaped trajectory is called a loop in the usual terminology. The burner 6 and the flue-gas output 8 can be parallel. The burner 6 and the flue-gas output 8 open into the combustion chamber 3.

Downstream of the flue-gas output 8 in the direction of movement of the flue gases, the facility can comprise a flue. The flue is a substantially horizontal duct for flue gases. The flue is in fluid communication with the combustion chamber 3 by the flue-gas output 8. The flue is made from refractory materials reinforced by an outer metal structure distant from the high-temperature zones. The flue does not have a valve. The flue leads the flue gases towards a chimney or a heat recuperator or a regenerator to heat the oxidizer.

The combined implementation of the loop burner 6 and the crown burner 38 provides a high yield and a glazing of the surface of the bath. The glazing is a rapid melting of the surface zone of the bath subjected to the action of the flame of the crown burner 38. The rapid melting prevents the release of dust from said zone. The glazing is obtained faster than in the absence of a crown burner 38 and granular glassy sodium silicate.

Moreover, trials relative to the duration of the delay D between the mixing (action of mixing) of the water, the sand and the sodium carbonate and the supply of the calcium oxide (quick lime) were carried out in relation to the temperature Tmp of the raw materials corresponding to the average ambient storage temperature and the moisture content H of the sand/soda mixture measured. Alumina, for example in the form of feldspar, feldspathoid and/or calcined aluminum is also mixed with the water, the sand and the sodium carbonate. These trials are reported in FIGS. 7 to 10. The measured temperature is on the ordinate and the time on the abscissa. The curves were set on the abscissa on a common reference to the time of introduction of the quick lime into the mixer previously containing a premix. The delay D ranges from 20 min. for trials 1, 5 and 6 to 60 min. for trial 7.

Here, the water was supplied to dry sand and mixed for 3 minutes. Then sodium carbonate and alumina were mixed with the wet sand for 2 minutes. The measurement of the moisture content H and of the temperature T of the premix was carried out. The water present before the introduction of the sodium carbonate and of the alumina reacts with the sodium carbonate via a reaction of hydration of the sodium carbonate with a rise in temperature of several degrees. The sodium carbonate reacts with said water at least in the trials of curves 1 to 3. Free water remains in the trial of curve 4 since the later supply of calcium oxide causes a strong and quick rise in temperature. Substantially no free water remains in the trials of curves 1 to 3 since the later supply of calcium oxide does not cause a rise in temperature. Moreover, a supply of water, for verification purposes, more than an hour after the addition of calcium oxide causes a strong and quick rise in temperature.

Later, the calcium oxide was added and mixed. The action of mixing was carried out in a concrete mixer with a capacity of 150 liters. In each trial the quantities implemented are: 19 to 20 kg. The nature and the origin of the raw materials are the same for trials 1 to 10. Finally, trials 1 to 10 were carried out by the same person following the same protocol, with the same concrete mixer at the same speed of rotation. The implementation and the precision of measurement correspond to semi-industrial trials closer to the reality of a production campaign than of a basic research laboratory, one goal being to identify phenomena occurring on the industrial scale. The masses implemented are 13 kg of sand, 4 kg of sodium carbonate, 2 kg of calcium oxide, 0.24 kg of alumina and water to reach the intended percentage.

The sand has a composition: $SiO_2$ at least 99%, $Al_2O_3$ less than 1%, $K_2O$ less than 0.1%, $TiO_2$ less than 0.03%, $Fe_2O_3$ less than 0.015%. The other elements are present in trace amounts. The sand has a D50 particle size between 0.20 and 0.25 mm. The sand has a particle size with at most 3% rejection with a screen of 0.355 mm, and at most 1% passage with a screen of 0.125 mm.

The sodium carbonate has a composition: $Na_2CO_3$ 99.75%, NaCl 0.03% and $H_2O$ less than 0.1%. The other elements are present in trace amounts. The sodium carbonate has a D50 particle size between 0.15 and 0.25 mm. The sodium carbonate has a particle size with at most 0.5% rejection with a screen of 0.600 mm, at least 90% rejection with a screen of 0.150 mm and at most 2% passage with a screen of 0.075 mm.

The calcium oxide has a composition: CaO at least 93%, MgO less than 2%, $CO_2$ less than 2%, $Fe_2O_3$ less than 0.1%, S less than 0.06%. The other elements are present in trace amounts. The calcium oxide has a D50 particle size between 0.08 and 0.12 mm. The calcium oxide has a particle size with at most 1.6% rejection with a screen of 5.00 mm, and at most 55% passage with a screen of 0.090 mm.

The maximum temperature Tmax reached in the hour following the addition of calcium oxide is measured. The temperature measurement is carried out by inserting a temperature probe into the mixture contained in the mixer, the mixer having been stopped. The first temperature trough observed on all the curves of FIG. 7 corresponds to the step of removing the temperature probe, adding the calcium oxide, actuating the mixer for 2 minutes, inserting the temperature probe again. The second temperature trough observed in curves 1, 2 and 3 corresponds to an additional step of adding excess water beyond the quantities indicated to verify the presence of calcium oxide more than an hour after the introduction of said calcium oxide. This addition of water translates into an exothermal reaction of hydration of the calcium oxide transforming it into calcium hydroxide. The rise in temperature observed after said addition of excess water allow to deduce therefrom that the calcium oxide remained previously present in the mixture.

Moreover, the fine observation of all of the curves before the addition of calcium oxide shows a rise in temperature indicating a water-sodium carbonate reaction. The temperature reached increases with the proportion of water, in particular by comparison between curves 1, 2, 3, 7 and 4 on the one hand and 6 and 5 on the other hand.

Before the addition of calcium oxide, a temperature maximum is reached, either very quickly for curve 4 in approximately 1 minute after the end of the action of mixing, that is to say approximately 3 minutes after the sodium carbonate and the alumina are placed in contact with the sand and the water, or slower for the other curves in approximately 10 minutes after the end of the action of mixing. The decrease in temperature after the maximum indicates that the water-sodium carbonate reaction has ended. The end of said reaction indicates that either all the available water has been trapped, or that all the available sodium carbonate has been hydrated and free water remains. Thus the fast reaction of curve 4 corresponds to the hydration of the sodium carbonate with excess water.

After the addition of the calcium oxide, the temperature is measured:
1) D=20 minutes Tmp=30° C. H=1%. Tmax<Tmp+15° C.
2) D=30 minutes Tmp=30° C. H=2%. Tmax<Tmp+15° C.

3) D=30 minutes Tmp=30° C. H=3%. Tmax<Tmp+15° C.
4) D=30 minutes Tmp=30° C. H=5%. Tmax>100° C.
5) D=20 minutes Tmp=1° C. H=2.7%. Tmax<Tmp+15° C.
6) D=20 minutes Tmp=1° C. H=1.8%. Tmax<Tmp+15° C.
7) D=60 minutes Tmp=30° C. H=4.1%. Tmax<Tmp+15° C.
8) D=25 minutes Tmp=30° C. H=3.44%. Tmax<Tmp+15° C.
9) D=30 minutes Tmp=30° C. H=5.1%. Tmax>100° C.
10) D=30 minutes Tmp=30° C. H=3.8%. Tmax>60° C.

Heating of less than 10° C. occurs upon water-sand-sodium carbonate mixture (action of mixing) in trials 2 to 4 and 7. Trials 4, 9 and 10 are unsatisfactory because of excessive heating upon introduction of the calcium oxide. The comparison of trials 2 and 6 on the one hand and 3 and 5 on the other show that the initial temperature of the raw materials Tmp has little to no influence on the maximum temperature Tmax. The comparison of trials 2, 3 and 4 on the one hand and 5 and 6 on the other hand shows that the humidity has little influence below a threshold. The threshold is located between more than 4.1 and less than 5% for D=30 minutes. However, the influence of the duration D is limited by the aptitude of the sodium carbonate to absorb available free water. However, the trials show that the quantity of water must be largely less than the theoretical maximum threshold. Moreover, the particle size of the sodium carbonate has an influence on the duration D. To a certain extent, the finer the particle size, the more the water is absorbed fast but risks initiating caking. In the case of caking, the water remains available for the quick lime, which results in a heating that it is desired to avoid.

In the case of a large particle size of the sodium carbonate, the applicant hypothesizes that the reaction with the water is limited, said reaction occurring on the surface of the grains of sodium carbonate but not or very little inside said grains. The particle size of the sand has little influence because of the quasi-null aptitude of the $SiO_2$ to be hydrated.

Trial no 2 was carried out with a cold, approximately 0° C., concrete mixer, which slowed down the reaction of hydration of the sodium carbonate. Trial no 2 is not entirely representative in the curve part before the supply of calcium oxide. In general, a supply of energy can be carried out in the form of heating of the concrete mixer and/or of the mixture to a temperature greater than the ambient temperature for example by a flame burner, electric heating, or injection of water vapor into the mixture, while remaining at a mixture temperature of less than 47° C.

Thus, the trials with 4.1% humidity in the mixture before the addition of quick lime for a duration D of at least one hour and at 3% humidity for a duration D of at least 10 minutes with a routine particle size of sodium carbonate provides satisfactory results. The small influence of the duration D beyond 10 minutes because of the temperature maximum reached before 10 minutes makes it so that a maximum of 4.1% humidity in the mixture before the addition of quick lime for a duration D of 10 minutes is of interest and would even be robust with respect to imprecisions in measurement or the industrial tolerances. An analysis of the left part of the curves provides teaching. Between the time 0 and the time of removal of the probe with a view to the supply of CaO—at 20; 30; 60 minutes according to the trials—the change in the temperature reflects the reaction of hydration of the sodium carbonate in contact with the wet sand. Between these times, the time range in which the local temperature maximum TNa is located is identified.

The local temperature maximum TNa indicates that the reaction of hydration of the sodium carbonate has substantially ended:
1) D=20 minutes Tmp=30° C. H=1%. TNa 5 to 7 minutes.
2) D=30 minutes Tmp=30° C. H=2%. TNa 13 to 15 minutes.
3) D=30 minutes Tmp=30° C. H=3%. TNa 5 to 7 minutes.
4) D=30 minutes Tmp=30° C. H=5%. TNa 1 to 2 minutes.
5) D=20 minutes Tmp=1° C. H=2.7%. TNa 11 to 13 minutes.
6) D=20 minutes Tmp=1° C. H=1.8%. TNa approximately 15 minutes.
7) D=60 minutes Tmp=30° C. H=4.1%. TNa 17 to 19 minutes.
8) D=25 minutes Tmp=30° C. H=3.44%. TNa 7 to 9 minutes.
9) D=30 minutes Tmp=30° C. H=5.1%. TNa>25 minutes.
10) D=30 minutes Tmp=30° C. H=3.8%. TNa 25 to 27 minutes.

The initial temperature Tmp of the raw materials has an influence on the water-sodium carbonate speed of reaction. At Tmp=30° C. the reaction is faster than at Tmp=1° C. by comparison between trials 2 and 6; 3 and 5. The speed of the reaction during trial no 4 corroborates a presence of excess water allowing fast hydration of the sodium carbonate. The relative slowness of the reaction during trial no 7 shows a water-sodium carbonate equilibrium. The stability between trials no 1 and no 3 shows that a duration D of approximately 10 minutes is sufficient and robust with raw materials at an initial temperature of 30° C. or more. Such a stability between trials no 1 and no 3, and between trials no 6 and no 5 shows that, with excess sodium carbonate with respect to the water, the reaction speed is not highly dependent on the concentration of water.

Moreover, during the later addition of excess water in trials 2 and 3 and during the addition of calcium oxide of trial 4, the temperature increased very quickly and simultaneously a large release of dust occurred. The right part of the curve of trial 1 starting at 1:49:20 is not representative for reasons specific to trial 1. This type of reaction is typical of the hydration of the quick lime, a highly exothermal reaction. The immediate hydration of the quick lime added to a mixture at 5% water and the absence of hydration of the quick lime added to a mixture at 2 to 3% water are thus verified. Moreover, the temperature curves of trials 3 and 7 at 3% and 4.1% water, respectively, have very similar shapes before and after the addition of quick lime. This strong similarity indicates that the mixture at 4.1% water does not contain free water.

Trials 8 and 9 were carried out with sodium carbonate fines passing through a screen of 0.250 mm while trial 10 was carried out with large particles of sodium carbonate not passing through a screen of 0.500 mm and passing through a screen of 1.000 mm. The origin and the batch of sodium carbonate are the same as for trials 1 to 7. A screening was carried out.

Trials 8 and 10 were chosen with a humidity allowing prediction of a satisfactory result while trial 9 was chosen with a strong humidity to test the possible influence of the particle size on the maximum humidity. The curve of trial 8 is close to the curve of trial 3. Trial 8 was interpreted as producing a complete consumption of the free water by the sodium carbonate in a rather short time of less than 10 minutes and a rise in temperature of less than 15° C. with respect to the initial temperature Tmp. The fine particle size does not have a major impact at the 3.44% moisture content. Trial 9 with a high humidity reveals a reaction of hydration of the sodium carbonate much slower than in trial 4. This is explained by a caking of the precursor mixture accompanied by hardening phenomena capable of slowing down the reaction.

Trial 10 with a large particle size and 3.8% humidity gives a curve different from the other trials in the step of hydration of the sodium carbonate. The temperature rises for more than 25 minutes, which indicates a continuation of the reaction of hydration of the sodium carbonate. During the removal of the temperature probe with a view to introducing the calcium oxide, there remains a doubt as to knowing whether the temperature maximum was reached. The cause of the slowness of the hydration of the sodium carbonate is the smaller available active surface of the sodium carbonate because of the large dimension of the particles of sodium carbonate.

During the addition of calcium oxide, trial 8 presents a rise in temperature comparable to trials 3 and 7, and thus satisfactory. The presence of water available to hydrate the calcium oxide is very low. Trial 9 presents a rise in temperature comparable to trial 4, and thus too high. The reduction in the particle size does not provide the effect of interest in the step of adding calcium oxide and has risks of caking. Such risks can be reduced by choosing a moisture content of 2% or less.

During the addition of calcium oxide, trial 10 presents a rise in temperature of approximately 30 to 35° C. above the temperature Tmp. This rise leads to a temperature greater than 60° C. when starting from Tmp=30° C. At 60° C., the risk of releasing irritating dust is high. The increase in the particle size brings a risk of excessive heating upon addition of calcium oxide, in particular if the temperature Tmp is greater than 15° C. Such a risk can be reduced by choosing a moisture content of 3% or less.

From trials 8 to 10, the absence of interest and certain disadvantages of the exclusively fine and exclusively large particle sizes are deduced. It is therefore preferable to provide a source of sodium carbonate having a particle size centred between 0.250 mm and 0.500 mm. This can include minority fractions of particles some smaller than 0.250 mm and others larger than 0.500 mm as shown by trials 1 to 7. Thus, a particle size of sodium carbonate with less than 5% passing through a screen of 0.075 mm, less than 15% passing through a screen of 0.150 mm and less than 5% not passing through a screen of 0.600 mm is suitable.

In the case of providing sodium carbonate having a large particle size, then the humidity would be limited to 3%. The hydration of the sodium carbonate would be faster than during trial 10 and the temperature after introduction of the calcium oxide would remain in a range of +0 to +15° C. with respect to the ambient temperature.

These calcium oxide trials were carried out with sodium carbonate. Their teaching can be applied with sodium carbonate and granular glassy sodium silicate.

Figure 11:
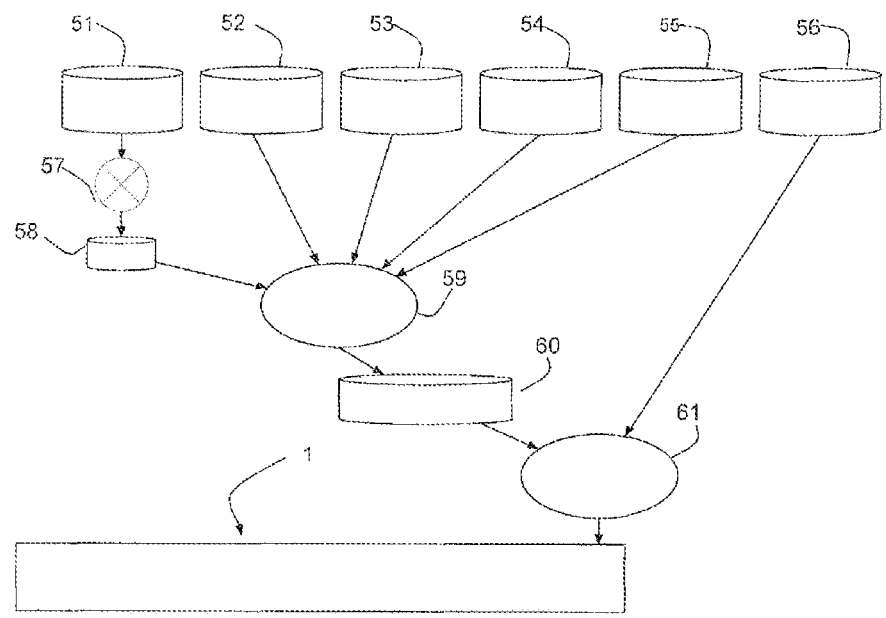
FIGS. 11 and 12 are perspective schematic views of a glass-making facility according to two embodiments.

FIG. 11 illustrates an embodiment in which the industrial glass-making facility comprises the furnace 1 with a tank for melted glass, and a supply system. The sodium silicate is stored in the form of balls or plates. A sodium silicate grinder 57 is disposed downstream of a first storage hopper 51. The first storage hopper 51 supplies the grinder 57. The grinding carried out by the grinder 57 produces aggregates having a particle size between 0.1 and 30 mm. At the output of the grinder 57, the granular glassy sodium silicate is stored in a second storage hopper 58. The output of the second storage hopper 58 is connected to a first mixer 59. The first mixer 59 is mounted at the output of individual supplies of the other raw materials except for the calcium oxide. Said other raw materials come from storage hoppers 52 to 55, for example for the sand, the sodium carbonate, the limestone and the alumina. The output of the first mixer 59 opens into a third storage hopper 60 sufficient for at least 10 minutes of production. The output of the third storage hopper 60 supplies a second mixer 61. The second mixer 61 receives the calcium oxide via an output of a fourth storage hopper 56 distinct from the output of the third storage hopper 60. The second mixer 61 can be formed by a plurality of conveyor belts. The movement of the raw materials on the conveyor belts in operation and at the end of conveyor belts provides satisfactory mixing. A supply of water to the first mixer 59 is optional according to the humidity of the raw materials to be mixed therein.

Figure 12:
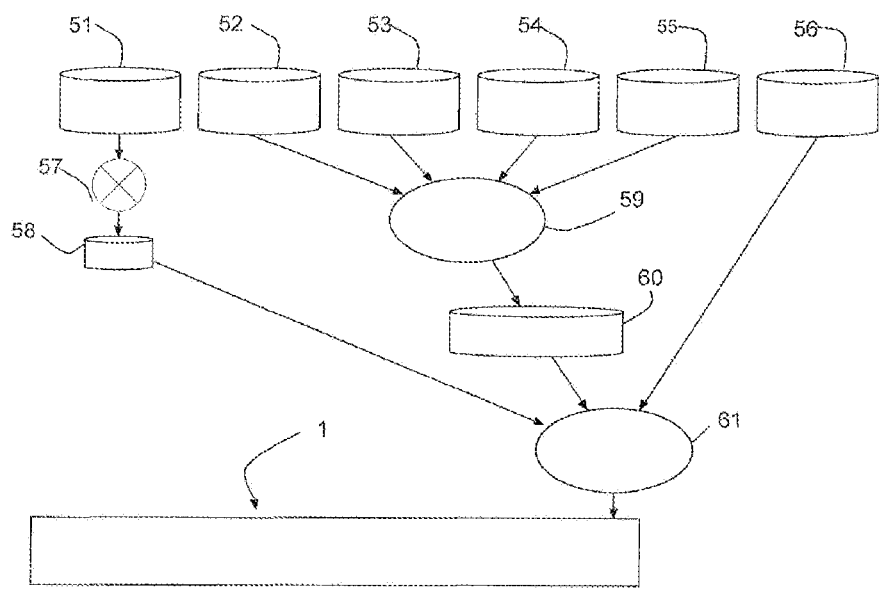

The embodiment of FIG. 12 is close to the previous one except that the output of the second storage hopper 58 is connected to the second mixer 61. The first mixer 59 is mounted at the output of individual supplies of the raw materials other than the calcium oxide and the granular glassy sodium silicate.

Alternatively, the output of the grinder 57 is connected to the first mixer 59. There is therefore no intermediate hopper 58.

Thus, the invention proposes a method for manufacturing glass comprising the supply in a glass-making furnace of a mixture of raw materials in the solid state, said raw materials comprising granular glassy sodium silicate and having a moisture content of less than 1% by weight and powdery calcium oxide, without voluntary supply of calcium carbonate. The granular glassy sodium silicate can cover from more than 0 to 100% of the supply of $Na_2O$.

In another embodiment, the method for manufacturing glass comprises the supply in a glass-making furnace of a mixture of raw materials in the solid state, said raw materials comprising granular glassy sodium silicate and having a moisture content of less than 1% by weight, dolomite and powdery calcium oxide, without other voluntary supply of calcium carbonate.

The invention proposes a method for manufacturing glass comprising the supply in a glass-making furnace of a mixture of raw materials in the solid state, said raw materials comprising granular glassy sodium silicate and having a moisture content of less than 1% by weight and powdery calcium oxide, without voluntary supply of magnesium carbonate. The granular glassy sodium silicate can cover from more than 0 to 100% of the supply of $Na_2O$.

The invention proposes a method for manufacturing glass comprising the supply in a glass-making furnace of a mixture of raw materials in the solid state, wherein said raw materials comprise powdery calcium oxide adding from more than 0 to less than 100% of the CaO present in the glass and can comprise granular glassy sodium silicate having a moisture content of less than 1% by weight. The granular glassy sodium silicate can cover from 0 to 100% of the supply of $Na_2O$. The remaining calcium can be supplied by limestone, dolomite, etc.

In a stabilized industrial production trial over several days, in a glass-making furnace, the limestone being replaced at 100% by calcium oxide, the partial substitution of the sodium carbonate by sodium silicate at 20% of the sodium supplied allowed an increase by 15% of the daily production of the furnace without said production having been pushed to the maximum, with respect to a previous production at 0% of the sodium supplied by sodium silicate and 0% of the calcium supplied by limestone. This corresponds to an increase of more than 40% of the daily production of the furnace without said production having been pushed to the maximum, with respect to a previous production at 0% of the sodium supplied by sodium silicate and 0% of the calcium supplied by calcium oxide. The other raw materials remained the same as before. The soda-lime glass produced had a quality similar to that of the previous production and was integrated into the downstream production process.

In another glass-making furnace, a stabilized industrial production trial over several days, the limestone being replaced at 20% then 40% by calcium oxide, the energy consumption per ton of glass decreased by 2.3% then by 5%. The other raw materials remained the same as before. The soda-lime glass produced had a quality similar to that of the previous production and was integrated into the downstream production process.

In another glass-making furnace, a stabilized industrial production trial over several days, the sodium carbonate being replaced at 10% then 20% by sodium silicate, the energy consumption per ton of glass decreased by more than 3% then by more than 4%. The other raw materials remained the same as before with supply of limestone. The soda-lime glass produced had a quality similar to that of the previous production and was integrated into the downstream production process.

In another glass-making furnace with electric heating, a trial of stabilized industrial production over several days of fluosilicate glass, the sodium is supplied between 10 and 100% in the form of sodium silicate. The other raw materials remained the same as before, including a supply of calcium in the form of limestone. The weight concentration of CaO in the fluosilicate glass is between 1 and 3%. The energy consumption per ton produced decreased and the temperature measured in the furnace decreased by more than 10° C., on average by approximately 25° C. in the case of the sodium supplied at 100% in the form of sodium silicate. The fluosilicate glass produced had a quality similar to that of the previous production and was integrated into the downstream production process.

In another glass-making furnace with electric heating, starting at 10% of supply of sodium in the form of sodium silicate and substitution at 100% of the limestone by calcium oxide, with a constant production of commercial-quality glass, a decrease in the wear of the furnace and a decrease in the temperature at the output of the furnace are observed. The service life of a furnace with 5, 10, 15 or 20% of $Na_2O$ provided in the form of sodium silicate is extended by several months for service lives of approximately 20 to 36 months. The preferred value is from 4 to 20%. In other words, the wear of the refractory materials decreases by approximately 11%. This results in a markedly greater total tonnage of glass produced between two rebuilds of the furnace. The refining is improved, which translates into a better quality of the glass. The melting of the raw materials is faster. These results are verified for a furnace at the end of its life as well as for a furnace in the middle of its life or at the beginning of its life. The energy consumption per ton produced increased less than throughout the previous production campaign. There is therefore a slower change in the energy consumption which tends to increase from the beginning to the end of a production campaign between two rebuilds of the furnace. With the same time passed from the beginning of the production campaign, the energy consumption even decreased by 4% between the previous production campaign and the production campaign in question.

The supply of calcium in the form of calcium oxide with sodium supplied at 100% in the form of sodium carbonate provides a decrease in energy consumption to an even greater extent with the supply of sodium silicate.

Moreover, the wear of the furnace is reduced, which is of great interest for the production of fluosilicate glass. The effect of the supply of calcium oxide is visible and favorable despite the low weight concentration of CaO in fluosilicate glass.

The invention claimed is:

1. Method for manufacturing glass comprising supplying solid raw materials in a glass-making furnace, said raw materials comprising granular glassy sodium silicate and having a moisture content of less than 1% by weight, and powdery calcium oxide, wherein the powdery calcium oxide is anhydrous and is at least one of a quicklime or calcinated dolomite.

2. The method according to claim 1, wherein said granular glassy sodium silicate has a particle size between 0.1 and 30 mm and is at ambient temperature.

3. The method according to claim 1, comprising a step of storing said sodium silicate, said stored sodium silicate being in the form of balls or of plates, and a step of grinding to obtain said particle size between 0.1 and 30 mm prior to supplying the sodium silicate.

4. The method according to claim 1, wherein the granular glassy sodium silicate has a molar ratio of between 2.5 and 5 $SiO_2$ for 1 $Na_2O$.

5. The method according to claim 1, wherein at least 17% by weight, of the calcium is supplied by the powdery calcium oxide for soda-lime glass, while at least 80% by weight of the calcium is supplied by the powdery calcium oxide for fluosilicate glass.

6. The method according to claim 1, wherein the sodium is supplied at more than 1% in the form of granular glassy sodium silicate for soda-lime glass or fluosilicate glass.

7. The method according to claim 1, wherein the granular glassy sodium silicate is mixed with at least one other raw material selected from the group consisting of: sodium, calcium, magnesium, boron, potassium, silicon, aluminum and fluorine.

8. The method according to claim 1, wherein said raw materials are mixed before charging, the calcium oxide being supplied after the other materials, and the mixture does not have a fraction in the liquid state.

9. The method according to claim 1, wherein said granular glassy sodium silicate adds between 2 and 50% of the sodium of the glass for soda-lime glass, the rest being supplied in the form of sodium carbonate, sodium sulphate, cullet and feldspar and said calcium oxide adds between 1 and 100% of the calcium of the glass, the rest being supplied in the form of calcium carbonate, cullet, dolomite and feldspar.

10. The method according to claim 1, wherein said raw materials comprise silica sand, sodium carbonate, and cullet to obtain a glass with $Na_2O$ between 10 and 20% by weight of the total.

11. The method according to claim 1, wherein heating of the furnace is carried out at more than 50% by a burner with a substantially horizontal flame and/or at least one lateral burner, the rest of the heating of the furnace being supplied by electrodes.

12. Industrial glass-making facility for implementing the method according to claim 1, comprising a furnace comprising a tank for melted glass, and a system for supplying raw materials provided with a member for supplying granular glassy sodium silicate, the member for supplying granular glassy sodium silicate comprising a sodium silicate grinder with an output connected to an input of the furnace via a buffer storage, and a storage of sodium silicate in the form of balls or plates, connected to an input of the grinder.

13. The glass-making facility according to claim 12, comprising at least one flue for evacuating combustion gases coming from the furnace, the flue opening into a furnace for firing glass-making raw materials.

14. The method according to claim 1, wherein said raw materials comprise silica sand, cullet, sodium fluosilicate and feldspar.

15. The method of claim 1 wherein a glass precursor mixture is prepared without supply of thermal energy.

16. The method of claim 1 wherein the granular glassy sodium silicate and the powdery calcium oxide are mixed before being supplied to the furnace.

17. The method of claim 1 wherein the powdery calcium oxide is supplied at least 10 minutes after the other raw materials are supplied to the furnace.

* * * * *